United States Patent [19]
DeVito

[11] Patent Number: 6,001,065
[45] Date of Patent: Dec. 14, 1999

[54] METHOD AND APPARATUS FOR MEASURING AND ANALYZING PHYSIOLOGICAL SIGNALS FOR ACTIVE OR PASSIVE CONTROL OF PHYSICAL AND VIRTUAL SPACES AND THE CONTENTS THEREIN

[75] Inventor: Drew DeVito, Norwalk, Conn.

[73] Assignee: IBVA Technologies, Inc., New York, N.Y.

[21] Appl. No.: 08/620,081

[22] Filed: Mar. 21, 1996

Related U.S. Application Data

[63] Continuation-in-part of application No. 08/510,387, Aug. 2, 1995, abandoned.

[51] Int. Cl.⁶ ........................................................ A61B 5/04
[52] U.S. Cl. ................... 600/544; 600/546; 340/825.19; 341/20; 463/36
[58] Field of Search ..................................... 600/544–546; 128/903; 463/36; 52/1; 341/20, 21; 340/825.19

[56] References Cited

U.S. PATENT DOCUMENTS

| 3,855,998 | 12/1974 | Hidalgo-Briceno | 128/2.1 B |
|---|---|---|---|
| 4,158,196 | 6/1979 | Crawford, Jr. | 340/163 |
| 4,949,726 | 8/1990 | Hartzell et al. | 128/731 |
| 5,213,338 | 5/1993 | Brotz | 273/460 |
| 5,243,517 | 9/1993 | Schmidt et al. | 364/419.2 |
| 5,263,487 | 11/1993 | Sakamoto et al. | |
| 5,279,305 | 1/1994 | Zimmerman et al. | 128/731 |
| 5,293,187 | 3/1994 | Knapp et al. | 351/210 |
| 5,295,491 | 3/1994 | Gevins | 128/731 |
| 5,299,118 | 3/1994 | Martens et al. | 364/413.05 |
| 5,310,195 | 5/1994 | Abdallah | 273/444 |
| 5,460,184 | 10/1995 | Sato et al. | 600/544 |
| 5,470,081 | 11/1995 | Sato et al. | 463/36 |
| 5,474,082 | 12/1995 | Junker | |
| 5,638,826 | 6/1997 | Wolpaw et al. | 463/36 |
| 5,772,508 | 6/1998 | Sugita et al. | 436/36 |

FOREIGN PATENT DOCUMENTS

| 0 301 790 | 1/1989 | European Pat. Off. |
| 0 301 790 A2 | 1/1989 | European Pat. Off. |
| 94/05201 | 3/1994 | WIPO |

*Primary Examiner*—Beverly M. Flanagan
*Assistant Examiner*—Bryan K. Yarnell
*Attorney, Agent, or Firm*—Fish & Richardson P.C.

[57] ABSTRACT

A method and apparatus are disclosed for measuring and performing real-time FFT analysis of bioelectrical signals such as (EEG and EMG) for the control of systems. Passive and active interaction with various electronic media such as video games, movies, music, virtual reality, and computer animations is also discussed. A method and apparatus for detecting the presence of a subject in a controlled area and for controlling real or virtual spaces is also disclosed.

11 Claims, 14 Drawing Sheets

S1: FILTER 8-12 HZ; FREQ (SPECTRAL PEAK)
FIG. 13
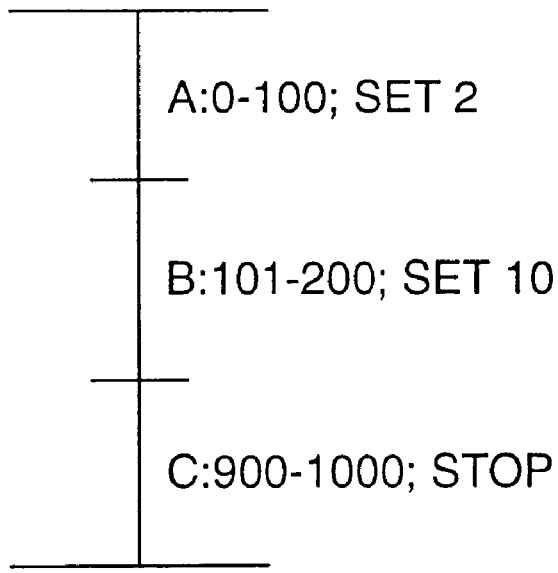
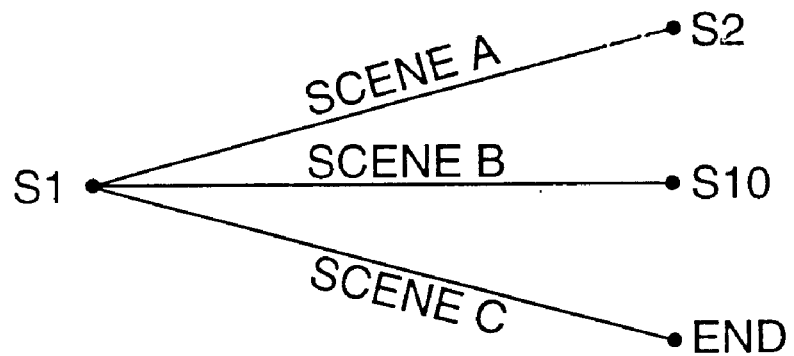
FIG. 14

METHOD AND APPARATUS FOR MEASURING AND ANALYZING PHYSIOLOGICAL SIGNALS FOR ACTIVE OR PASSIVE CONTROL OF PHYSICAL AND VIRTUAL SPACES AND THE CONTENTS THEREIN

CROSS REFERENCE TO RELATED APPLICATIONS

This application is a continuation-in-part of application Ser. No. 08/510,387 filed Aug. 2, 1995, now abandoned, whose contents are incorporated by reference.

REFERENCE TO APPENDIX

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

FIELD OF THE INVENTION

The present invention relates generally to the field of control systems based upon the real-time analysis of electrical measurements of physiological parameters, such as brainwaves (EEG) from an animal or electrical signals from a plant or other subject. In particular the present invention relates to the measurement and real-time analysis of bio-electrical signals for interaction with electronic media, such as motion pictures, digital video, video games, next-generation two and three dimensional games, virtual environments, and virtual world manipulations and other interactive environments. The principals of the present invention may however be extended to the control of other systems such as alarm systems and control of surveillance cameras.

BACKGROUND OF THE INVENTION

Sensed physiological parameters, and in particular bio-electrical signals (also called "bio-signals") such as brainwaves (EEG) and muscle signals (EMG) have been used to control electrical devices such as lights, music, game boards and children's toys. Previous control methods have relied upon threshold detection schemes wherein the voltage level of a band-limited signal exceeds a certain level (Hartzell et. al., U.S. Pat. No. 4,949,726), or on evoked potentials (Abdallah, U.S. Pat. No. 5,310,195), or on action potentials (Crawford Jr., U.S. Pat. No. 4,158,196). Other previous control methods alternatively calculate the peak power value using a Fast Fourier Transform (the "FFT") and determine whether the peak power exceeds a predefined threshold or the amount by which the threshold is exceeded for control. One drawback of those methods is that the person controlling the devices must learn how to generate particular signals in order to affect control, or must be provided with particular kinds of external stimuli. For example, in an alpha wave controlled system, the subject must learn to relax to reduce the amplitude of the brain (EEG) signals in the 8–12 Hz band. Another drawback of such threshold detection schemes is the susceptibility of the system to spurious signals such as muscle movement, for example, eye movement. Previous methods use specialized dedicated links between the subject and the controlled system.

As a result, there is a need for an improved method and apparatus for detecting and analyzing physiological signals, for utilizing the results of the analysis that does not require significant user training, and for utilizing the results of the analysis for the passive or active control of physical and virtual spaces and the contents therein.

SUMMARY OF THE INVENTION

Broadly, the present invention is directed to sensing physiological signals corresponding to the state of the subject that is being monitored, processing those signals in real time to develop a set of control parameters representative of the physiological state of the being, and using those developed control parameters, by means of a set of predefined relations (such as a look-up table or logic machine) that operates to map selected ones of the developed control parameters to command codes that are output to operate a control system. The mapping function may be user defined and/or variable in the case of certain control systems, or predetermined and fixed in the case of other control systems, and may include simple threshold or range comparisons, or more complex logical comparisons involving more than one control parameter.

A method in accordance with one aspect of the invention discards bio-signals having an amplitude outside a predetermined range, calculates the power spectrum in each of one or more predetermined bands, and calculates the total power across a plurality of the bands. The median frequency in each band and the relative power of each band are also calculated. Calculated values are compared with one or more previously calculated values from which a reliability factor for the calculated values are determined.

An apparatus in accordance with one aspect of the invention includes one or more physiological sensors, an analog-to-digital converter, a computer, and an interface to a controlled system. The analog-to-digital converter converts electrical signals produced by the sensors in response to physiological changes in the subject into digital values. The digital values are analyzed by the computer to provide relative power values in one or more of a plurality of frequency bands and median frequency values for one or more of a plurality of the frequency bands. The computer provides control signals to the controlled system based upon one or more of the relative power values or the median frequency.

As will be explained in more detail in the following discussions, the developed control parameters and predefined mapping relations may be selected by the user or designer of the control system, and such control systems may be command code responsive operating systems. Motion pictures, digital video, video games, next generation two and three dimensional games, virtual environments, and virtual world manipulations are some examples of interactive environments that may be controlled or influenced by the control system command codes. Additionally, alarm systems and surveillance cameras may be activated by the command codes.

A presence detecting function which senses the relationship of a subject to a predetermined space may be used to select an object or appliance to be controlled within a space. The control signals may be used to affect objects e.g., a compact disk player, or to affect the environment, e.g., lighting, within or without the controlled space. The system may be used to control a physical space, such as a home, or a virtual space, such as in a computer generated environment, or a combination of physical and virtual spaces.

An apparatus in accordance with one aspect of the invention includes at least one selector connected to one or more presence detectors for selecting a subject satisfying a predetermined relationship with the presence detectors. A control processor is connected to the selector and has an input for receiving bio-signals from the selected subject. The control processor includes an output for providing control signals to the objects under control.

A method in accordance with one aspect of the invention evaluates the relationship of a subject to a control space. Bio-signals sensed from a subject satisfying a predetermined relationship with the space are selected for control of at least one object or environmental parameter. The bio-signals are converted into one or more frequency domain parameters, one or more tests are performed on a preselected one or more of the frequency domain parameters according to preselected criteria, and control signals are provided according to at least one test result.

BRIEF DESCRIPTION OF THE DRAWINGS

A better understanding of the invention may be had from a consideration of the following Detailed Description, taken in conjunction with the accompanying drawings in which:

FIG. 13 is a schematic representation of a script for a set in an interactive movie.

FIG. 14 is a schematic flow diagram for the script of FIG. 13.

DESCRIPTION OF THE PREFERRED EMBODIMENTS

Figure 1:
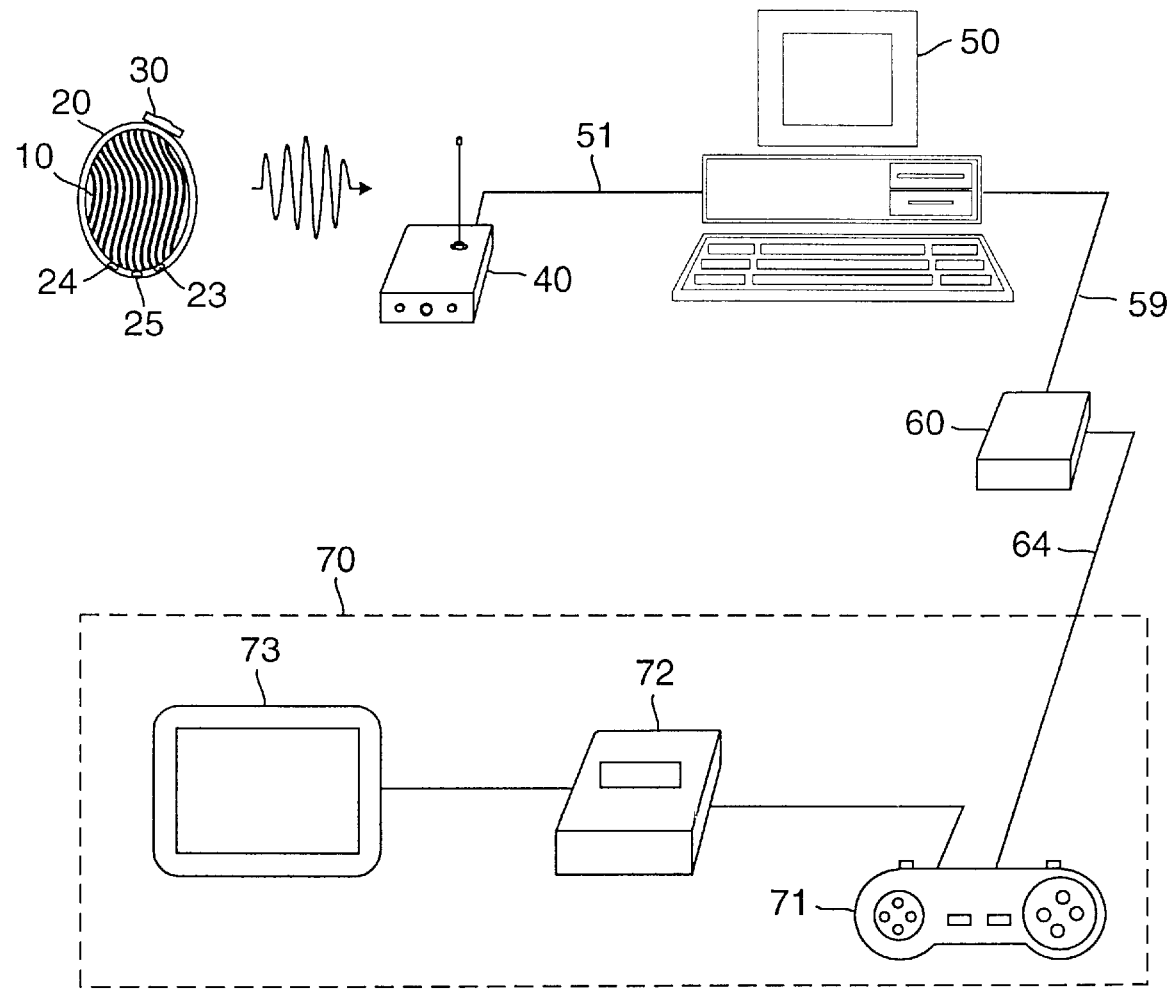
FIG. 1 is a block diagram of one embodiment of the present invention in an apparatus for control of a video game.

The overall system operation of the present invention in an interactive game control environment which uses bio-signals that are EEG signals will first be described with reference to FIG. 1. EEG signals, picked up from the subject playing the game, are processed to control the video game. An Interactive Brainwave Visual Analyzer (IBVA) device, a commercial product currently available from IBVA Technologies, Inc., 249 East 48th Street, New York, N.Y. 10017, includes a plurality of physiological sensors, more specifically three electrodes in contact with the subject's forehead to pick up the EEG signals. The sensed EEG signals are then transmitted to a computer for analysis in accordance with one aspect of the present invention. A single channel IBVA system is shown in FIG. 1 and described for simplicity. It is noted that the present invention may be readily extended to systems having more than one channel and more than one subject although some mediation between channels or subjects may be required. The EEG signals, which are representative of the subject's emotions or state of mind, alter the game environment according to the subject's sensed state. This system also picks up muscle signals (EMG) which are typically ignored (suppressed by filtering) in this first described embodiment of the present invention. However, EMG signals can be utilized as a trigger, for example, by conscious side-to-side eye movement, to select a control option as described below.

The subject's head 10 is fitted with headband 20 having integral electrodes 23, 24, 25 which make touching contact with the subject's forehead and sense the bioelectrical potentials at the contact points. These bioelectrical potentials comprise the EEG signals. The sensed EEG signals are amplified and digitally encoded and sent by a transmitter 30 to a receiver 40. The receiver 40 receives and provides to a computer system 50 a serial bit stream representative of the EEG data samples. The computer 50 processes the received data and performs numerous Fast Fourier Transform (FFT) calculations on the received data samples. The computer 50 then processes the FFT results and generates and sends control values to an interface 60. The interface 60 interprets the control values and supplies appropriate "game" specific signals to video game 70 through game controller 71.

Figure 4A:
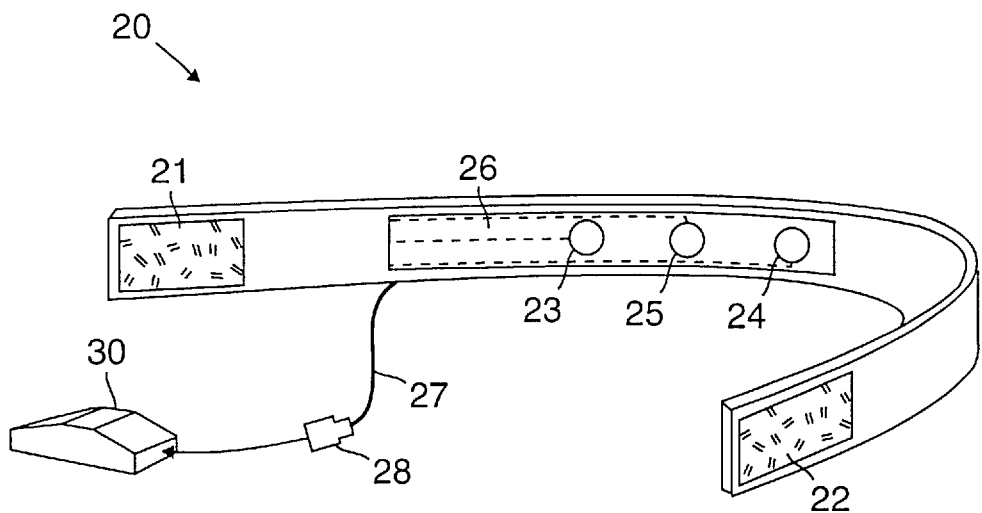
FIG. 4(a),(b) and (c) are perspective views of a single channel electrode headband with transmitter.
Figure 4B:
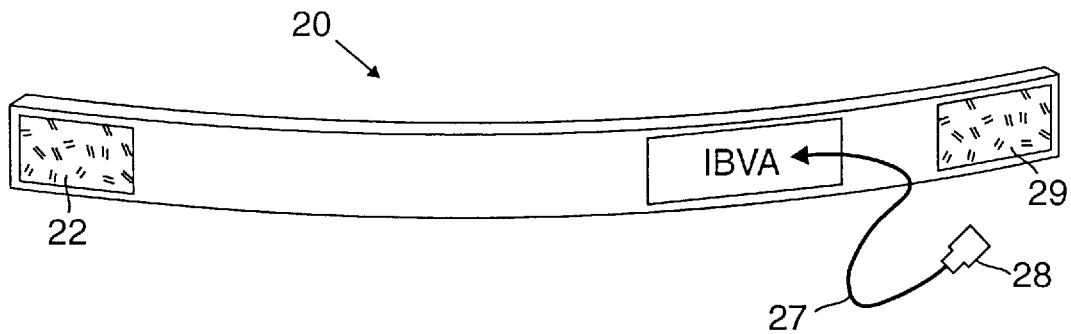
Figure 4C:
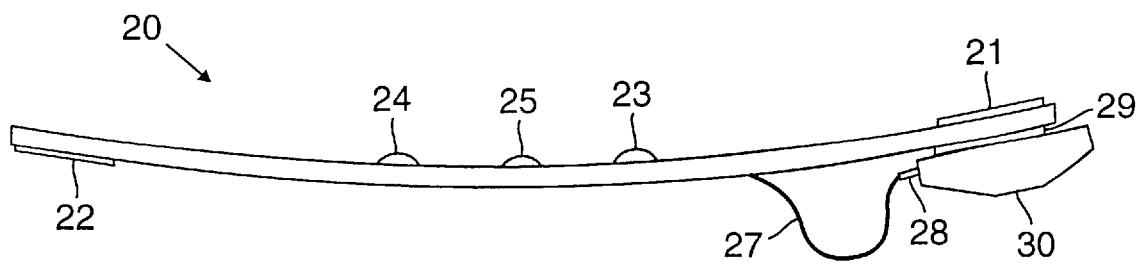
Figure 5A:
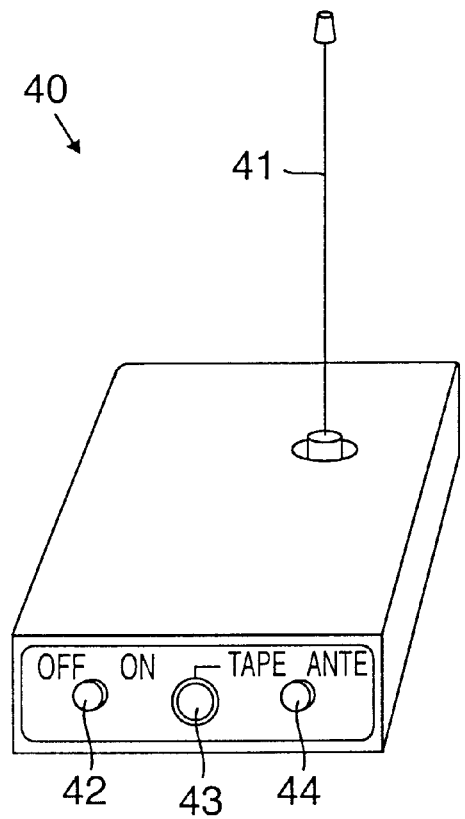
FIG. 5(a) and (b) are perspective views of the IBVA receiver unit.
Figure 5B:
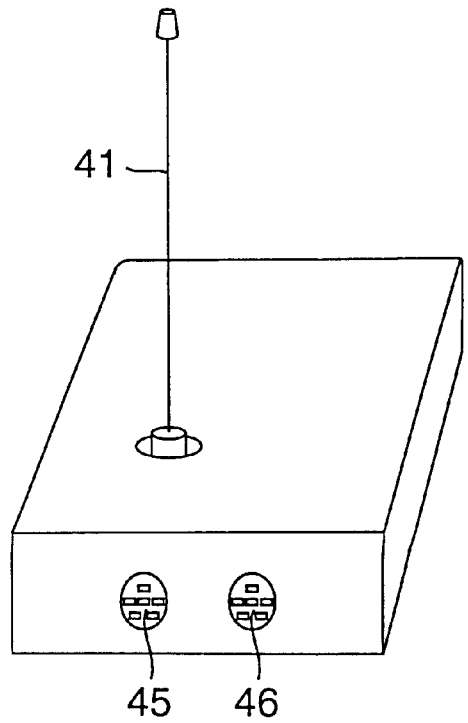

Referring now to FIG. 4, a single channel headband 20 is shown in greater detail. Headband 20 provides a convenient electrode retention mechanism and mount for transmitter 30 which is removably attached to the headband 20 using a hook and loop fastener 29 such as is commonly available under the VELCRO trademark. The transmitter 30 is provided with an electrical connector which mates with the headband electrical connector 28 for receiving the electrical signals from the electrodes.

Three electrodes are required for a single channel EEG monitoring system. A reference electrode 25, a positive electrode 23, and a negative electrode 24 are each located on the inside portion of headband 20 that makes contact with the subject's forehead. In a two channel system, an additional positive and negative electrode for the second channel are added to headband 20.

Snap connectors are fixed to headband 20 at the electrode locations which allow the use of disposable electrodes. The snap connectors are electrically connected to conductors 26 and flexible film substrate which are routed inside the headband and connected to cable 27 terminating in connector 28. Electrodes 23, 24, and 25 may be any standard disposable type, however, the "gummed" style electrodes are preferred over gel electrodes because they are not messy and may be reused.

Hook and loop fasteners 21 and 22 allow the headband 20 to be snugly fastened around the subject's head 10. The headband 20 should be positioned with the electrodes making contact with the forehead just below the hairline and with the reference electrode 25 in the center of the forehead. The subject's forehead should be clean and dry for best results.

The impedance at the point of contact between the electrodes and the skin should be less than 100,000 Ohms and for best results should be less than 10,000 Ohms. The latter may be achieved by rubbing the skin with gauze soaked with alcohol, and using fresh moist electrodes, or gel electrodes.

In an alternative arrangement, the electrodes may be attached to any part of the scalp using short extension wires having snaps to mate with the headband snaps and with the electrodes. Traditionally, the electrodes are connected in the 10–20 configuration for medical use and any of these positions may be reliably used with the present invention. The earlobes or forehead are used for convenience, however, better signals are obtained from the back and top of the head where muscle and eye signal interference is reduced.

Figure 6:
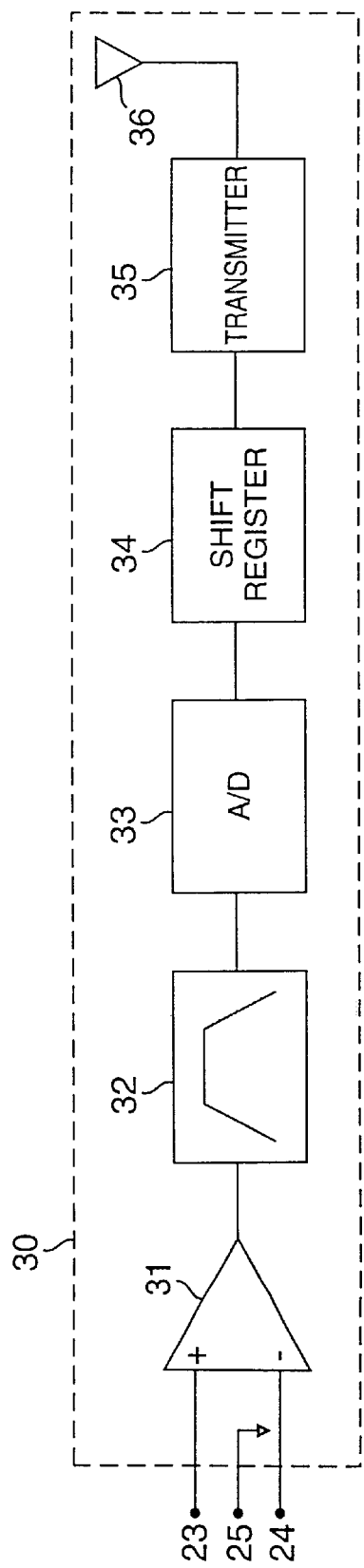
FIG. 6 is a block diagram of the IBVA transmitter.

Referring now to FIG. 6, transmitter 30 will be discussed in greater detail. Electrical signals picked up by the electrodes 23, 24, 25 are presented to a low noise differential amplifier 31. Amplifier 31 provides a differential gain of 10,000 and a common mode rejection ratio of 100 dB. Bandpass filter 32 has a low frequency cutoff of 0.1 Hertz (Hz) and a high frequency cutoff of 60 Hz. The filter rolloff is 80 dB per decade.

The output of filter 32 is connected to an analog-to-digital (A/D) converter 33 which samples the amplified signal 120 times per second and digitally encodes each sample. An 8 bit digital representation of the input signal is suitable for use. The A/D converter 33 provides an output value of 255 for a differential input voltage (to the amplifier 31) of +100 micro Volts ($\mu$V) and an output value of 0 for a –100 $\mu$V input.

The 8 bit digital output from the A/D converter 33 is then converted to a serial bit stream by shift register 34. A 300 MHz low power RF telemetry transmitter 35 with internal antenna 36 then transmits a 2400 BAUD serial bit stream to receiver 40 using pulse code modulation.

Figure 7:
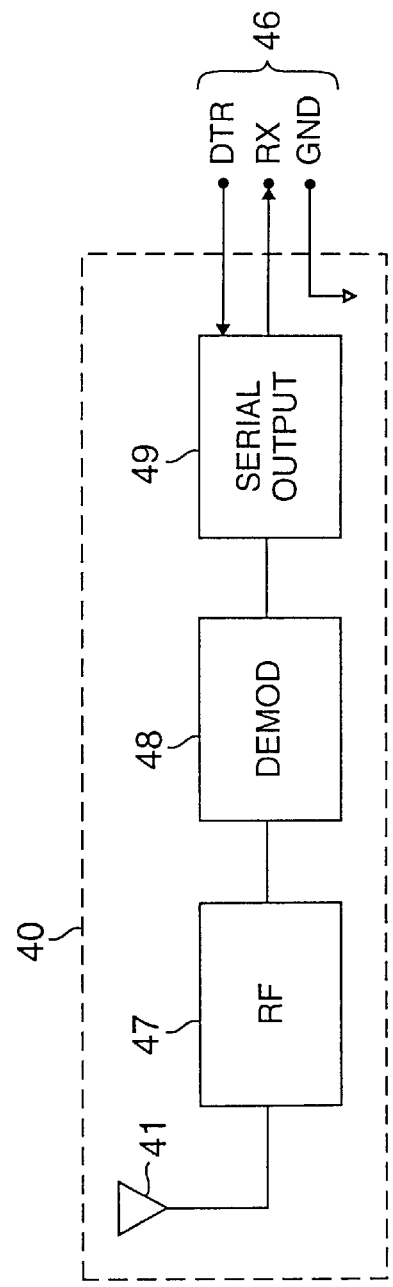
FIG. 7 is a block diagram of the IBVA receiver.

Referring next to FIG. 7, receiver 40 will be discussed in greater detail. Antenna 41 picks up the 300 MHz RF signals which are amplified by an RF amplifier stage 47. Demodulator 48 recovers the digital data stream from the amplified RF signal. Serial encoder 49 then sends the received data to computer 50 via the RS232 or RS422 serial output port 46. A 2400 baud rate is sufficient for the 120 Hz sampling frequency. For simplicity, a subset of the RS232 or RS422 port signals may be used. In the commercial IBVA device, only three signal lines, Data Terminal Ready (DTR), Receive (RX), and signal ground, are used, however, the allowable cable length is reduced to about ten feet. The IBVA device is thus conventionally used to pick up, differentially amplify, filter, and digitize the signals from electrodes 23 and 24 and transmit the digitized samples to computer 50.

Figure 8:
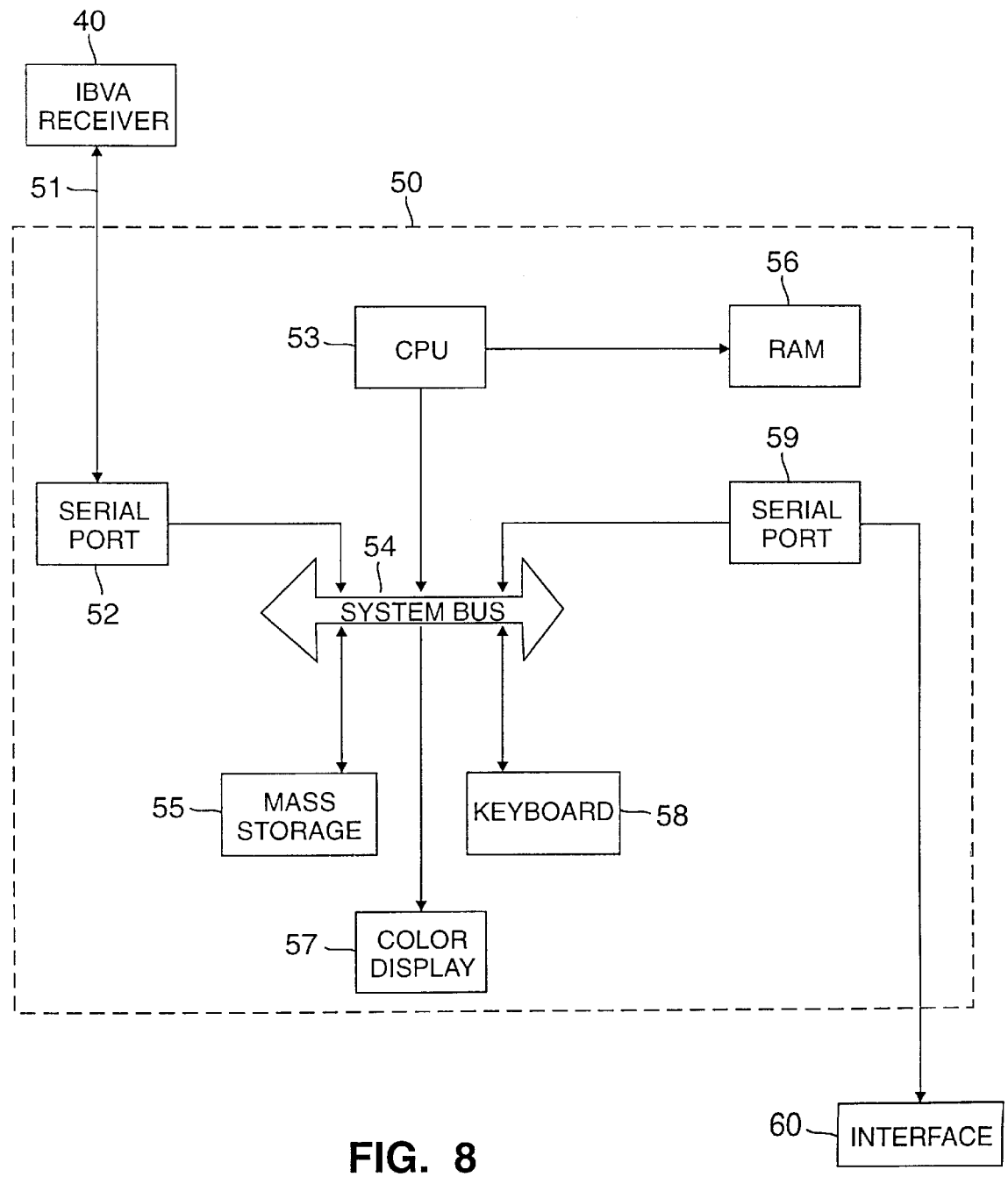
FIG. 8 is a block diagram of a computer control system connected to an IBVA receiver and to an interface for providing command codes.

Referring to FIG. 8, the computer system 50 will be described briefly. Computer 50 can be any general purpose or personal computer. The present invention has been successfully implemented on a broad range of personal computers from Apple Computers including the Macintosh MAC II+ model through the Power PC 9500 model.

A typical computer system 50 for use with the present invention includes a central processing unit (CPU) 53, random access memory (RAM) 56, a system bus 54, mass storage 55 such as a hard disk drive, a display 57 (preferably a color display), a keyboard 58, a serial input port 52 and a serial output port 58. The CPU 53 performs calculations on the sample data values which it receives via serial port 52. The computer 50 receives 120 digitized samples per second via its serial input port 52. As each sample is received by the computer, it is decoded into its corresponding voltage level, e.g., 0 is decoded into –100 $\mu$V, 255 is decoded into +100 $\mu$V, etc. and then stored in memory—for analysis. Due to the location of the electrodes on the forehead, brainwave activity (EEG), eye movement and muscle movement (EMG) are all monitored through the same electrodes. These signals can be distinguished by their unique characteristics such as frequency and amplitude and changes in frequency or amplitude over time. The computer 50 then generates control values which are sent to the interface 60 via serial output port 58.

In an alternative embodiment a dedicated FFT processor may advantageously be used to perform the FFT calculations in hardware. Such a system may allow computer 50 to analyze a greater number of parameters, or a less sophisticated/powerful computer to be used, to minimize manufacturing costs.

Display 57 may be used to display the data in many formats such as a real-time graph of the time domain signals in amplitude verses time, a two-dimensional FFT Power spectrum (Power versus Frequency) updated periodically (after each FFT calculation), or a three-dimensional waterfall power spectrum display of Power versus Frequency versus time. Alternatively, it may be used to display the output control signals or images controlled by the output variables.

Figure 2:
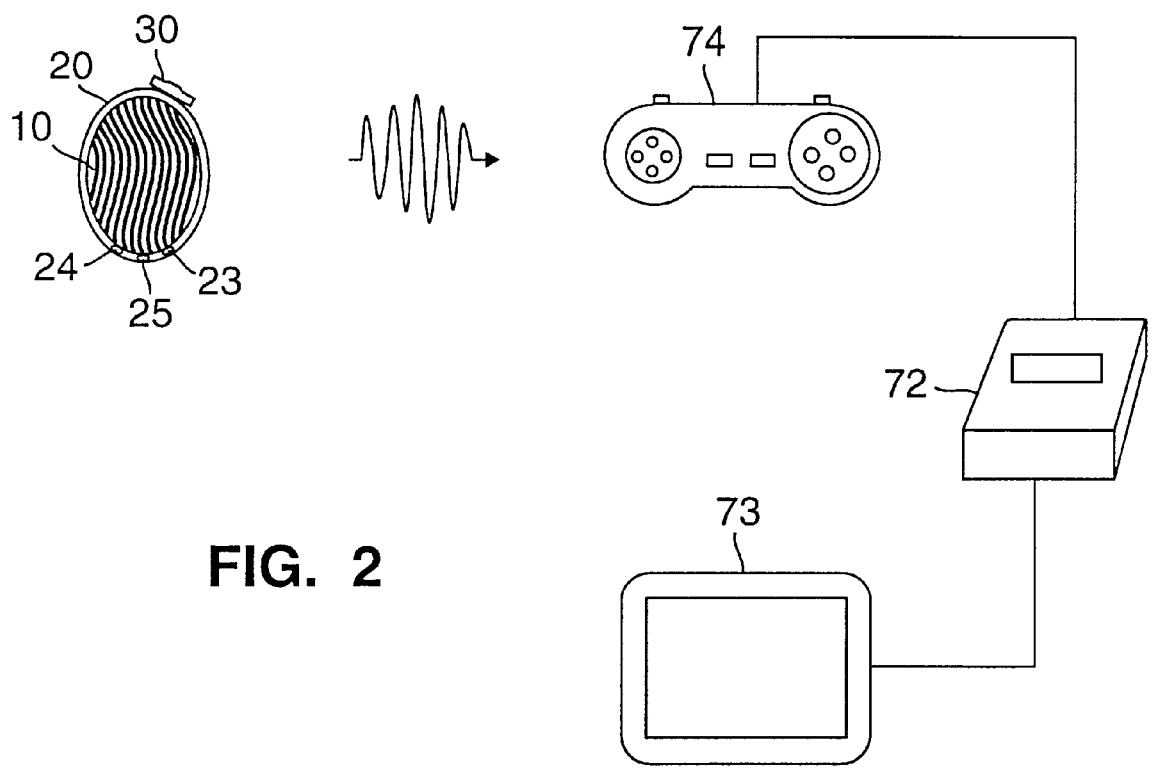
FIG. 2 is a block diagram of another embodiment of the present invention in an apparatus for control of a video game.

In the preferred game control embodiment, the receiver 40, the computer 50, and the game interface 60 are combined into a miniaturized game control 74 as shown in FIG. 2. The commercially available telemetry receiver components are small enough that no changes would be required to fit the receiver 40 into the game control 74. A signal processor chip such as the TMS32COX series from Texas Instruments, along with memory, and serial I/O microprocessor would replace the computer 50 and game interface 60 in such an embodiment. There would be no need for mass storage 55, display 57, and keyboard 58 in the alternative embodiment since the applications would be limited to the game interface.

Data Analysis

Figure 9:
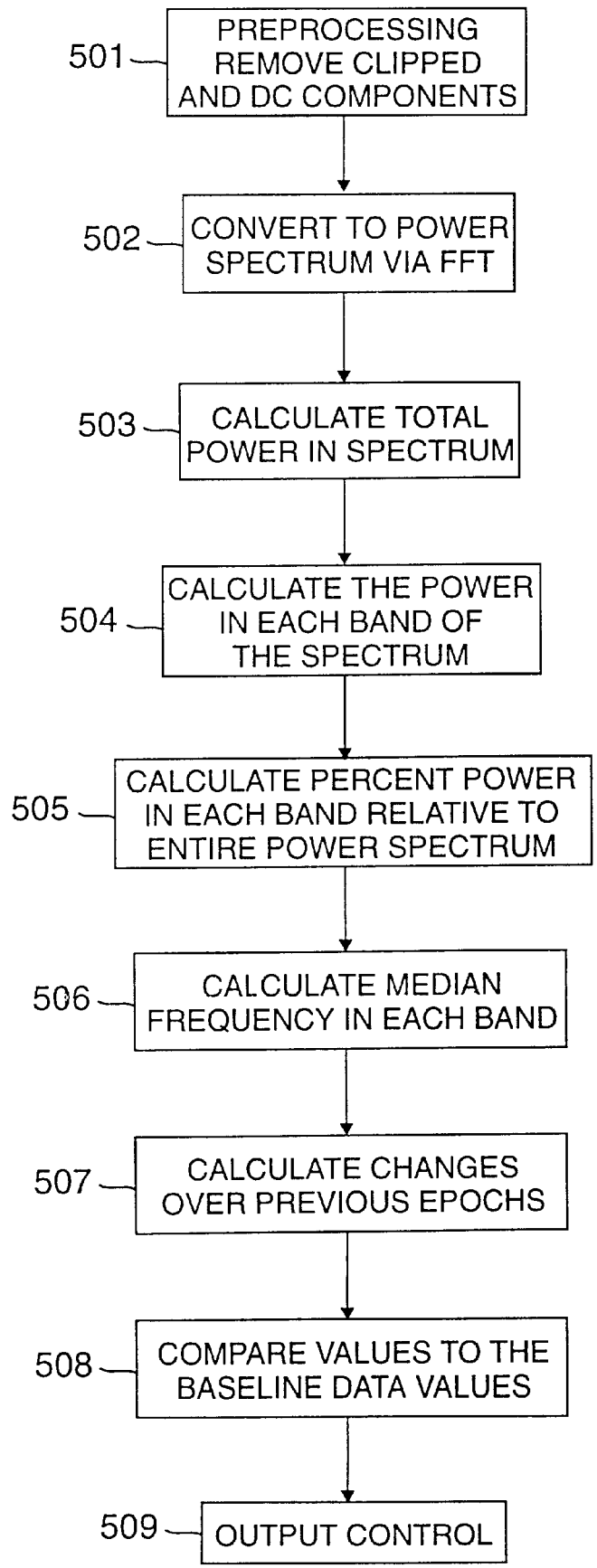
FIG. 9 is a flow chart of a method for real-time analysis of the measured bio-signal.

Referring now to FIG. 9, the method of analyzing the digitized samples to produce control values will be described in greater detail and in a general control system environment. In this regard, the data analysis and control signal generation is general to any control system, although selected ones of control values may be used differently from one system to another and from one type of system to another, as will be explained below. One embodiment of the present invention performs a Discrete Fourier Transform of the digitized samples to analyze the frequency domain characteristics of the bio-signals. More preferably, an optimized FFT algorithm or a dedicated FFT processor is used to perform the FFT in real time.

Any FFT algorithm may be used, either integer or floating point, depending on the performance of the computer (CPU) platform available. FFT algorithms and their use in processing signals, and in particular EEG signals, are well known. The reader is therefore referred to the many papers and books available on the subject. "The FFT Fundamentals and Concepts" by Robert W. Ramirez, Prentice-Hall, Inc., Englewood Cliffs, N.J. 07632, 1985 is one reference available on the subject and is incorporated here by reference. See also U.S. Pat. No. 5,299,118.

For use with the present invention, an FFT length is selected and an FFT length of between 32 and 512 time domain data samples has been used successfully. The FFT length is chosen for the degree of smoothing required for control and the desired frequency resolution. If a quick and responsive, but highly variable control is desired, a short FFT length is used. If a less responsive, smoothly changing control is needed, a longer FFT length is used. In a system having a fixed sample rate, the FFT frequency resolution is related to the number of samples used in the calculation. Thus, FFT length of 128 samples using the fixed sampling rate of 120 Hz in the IBVA system yields a frequency resolution of approximately 0.94 Hz. An FFT length of 256 samples would yield twice the frequency resolution (0.47 Hz), etc.

The group of time domain samples used in the FFT calculation may be called an epoch. Adjacent epochs may overlap using some of the samples from the previous epoch or epochs. The degree of overlap sampling (epoch overlap) in a given system will be limited by the operating speed of the computer 50 or FFT processor. Faster operating machines will be capable of processing more epochs than slower operating machines, thus allowing greater epoch overlap. For example, a Macintosh MAC IIfx computer is capable of processing approximately 10 FFTs (of 128 data samples per epoch) per second.

Preprocessing of Data Samples 501

In the preferred embodiment, the stored digitized samples are examined for signs of clipping before the FFT is performed. Clipping occurs when a bio-signal having a differential amplitude greater than the largest amplitude level that the amplifier 31 and A/D converter 33 are capable of amplifying and quantitating linearly is picked up by electrodes 23 and 24. Any such bio-signal registers in the circuit as the largest positive or negative value that the amplifier 31 and A/D converter 32 can quantitize, i.e., 0 or 255.

Signals between −100 and +100 μV can be linearly quantitized by the IBVA amplifier 31 and A/D converter 33. This range is too limited to convert the magnitude of sensed eye movement (EMG) activity, which may present voltages in the millivolt range, and thus results in clipping of that signal. When clipping occurs, it is easily detected because a series of at least ten −100 μV or +100 μV sample values occur. In order to prevent the clipped samples from generating square wave harmonics in the FFT analysis, the clipping detection section 501 replaces the clipped data values with zero μV values. In this way the clipped signals and their sample values are discarded.

Once processed for clipping, the average value of the samples in an epoch is calculated and subtracted from each sample. In this way the DC (zero frequency) component is removed from the data samples thus magnifying the nonzero frequency components in the FFT power spectrum.

Power Spectrum 502

At step 502, the preprocessed digitized signals are converted by the FFT from the time domain to the frequency domain. The resulting FFT coefficients for the positive frequencies are then converted to a polar form by taking the square root of the sum of the squares of the real and imaginary components of each coefficient. The resulting magnitudes of the spectral components (referenced to as the "power spectra") are the basic parameters available for use in the process for developing the control parameters described below. Alternatively, the phase components may also be used in the analysis. For example, the relative phase of the spectral components between hemispheres of the brain may be compared using a system having two or more channels.

Frequency Filter

Figure 10:
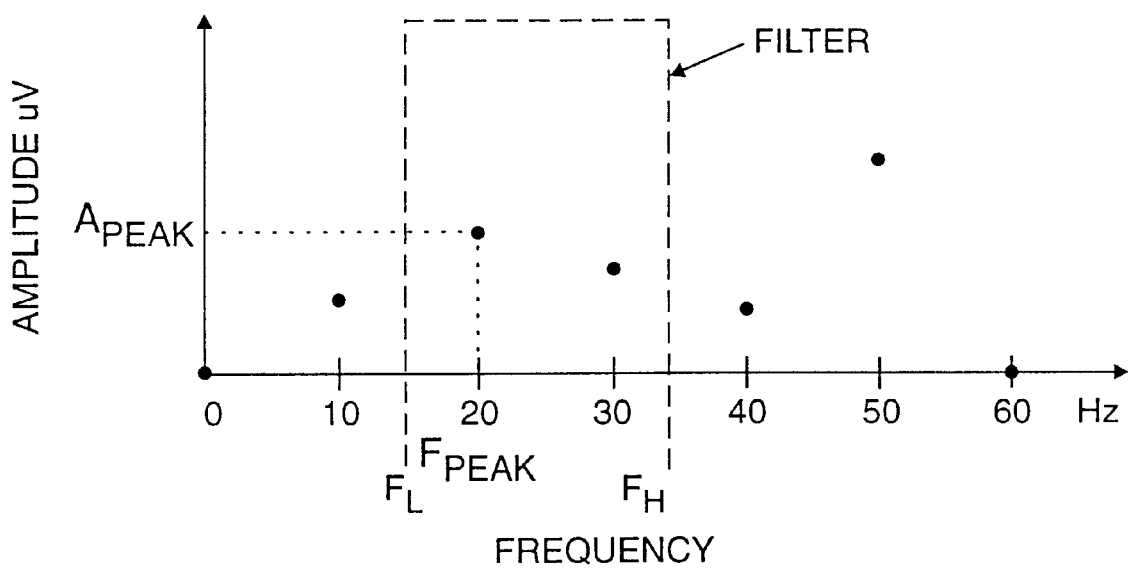
FIG. 10 is a graphical depiction of a sample FFT power spectrum before frequency filtering.

The FFT power spectra may optionally be passed through a frequency filter specified by the user if only a limited frequency range is of interest. The user may specify low frequency and high frequency cutoffs, $F_L$ and $F_H$. Referring to FIG. 10, a hypothetical frequency filter is shown superimposed on a sample FFT power spectra. All FFT coefficients below the low frequency cutoff $F_L$ or above the high frequency cutoff $F_H$ i.e., outside the dotted box (labelled Filter in FIG. 10), may be discarded, multiplied by zero, or altered by some other mathematical function to suit the user's needs.

Control Parameters

The power spectra may be used to calculate any of a number of control parameters, including the frequency and amplitude of the largest spectral component, the total power in the spectrum (spectrum power) 503, the power in each band (band power) 504, the percent of total power in each band (relative band power) 505, the median frequency in the spectrum (median frequency) or in each band (median band frequency) 506, and the changes from previous epochs 507. These control parameters (explained in further detail below) are collectively more robust measures of physiological activity than the previously used threshold voltages or power levels.

Peak Frequency

The frequency and amplitude of the spectral component having the largest amplitude in the power spectra (before or after frequency filtering) may be used as control parameters. For ease of reference, this component will be called the spectral peak. Referring to the sample power spectra in FIG. 10, the 20 Hz spectral component is the spectral peak after filtering, i.e., the spectral component with the largest amplitude in the box. Either or both of its frequency, Fpeak, (20 Hz) and amplitude, Apeak, may be used for control. Alternatively, the spectral peak of the spectrum before filtering may be used. In the example shown in FIG. 10, the 50 Hz spectral component is the spectral peak before filtering.

Figure 11:
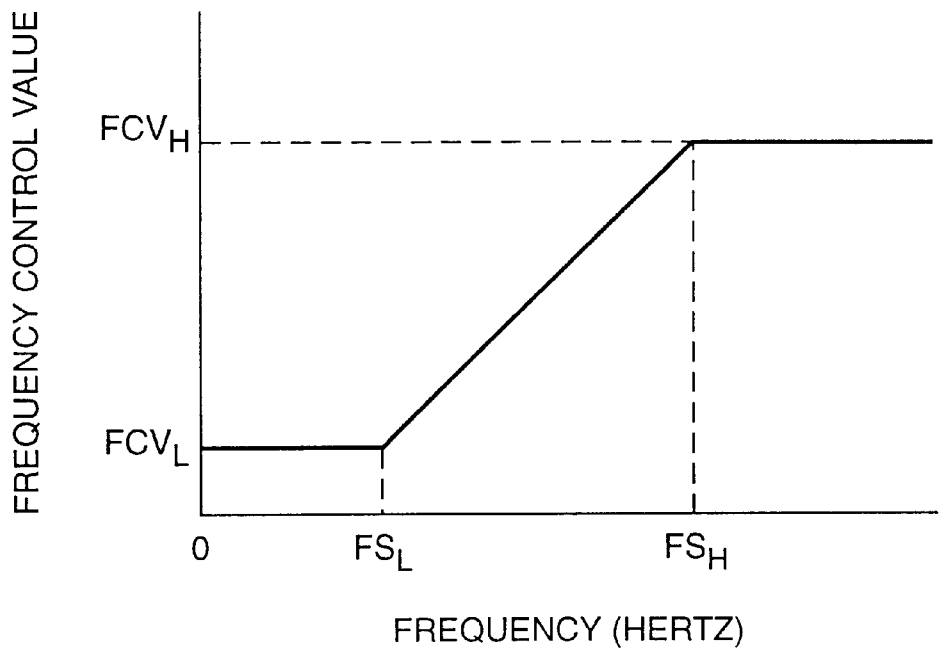
FIG. 11 is a graphical depiction of an example for scaling a frequency e.g., the frequency of the spectral peak, to a frequency control value.
Figure 12:
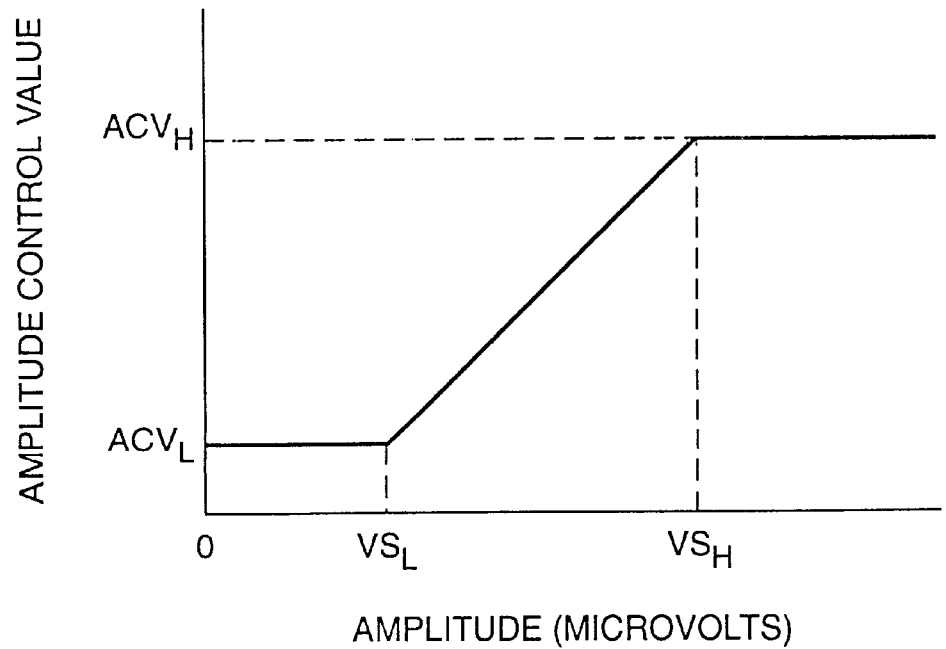
FIG. 12 is a graphical depiction of an example for scaling an amplitude, e.g., the amplitude of the spectral peak, to an amplitude control value.

Referring to FIG. 11, the frequency of the spectral peak may be converted to a control number (step range) using a frequency scale factor which incudes an upper and lower frequency, $FS_H$ and $FS_L$, and an upper and lower control value, $FCV_H$ and $FCV_L$. A frequency control value (FCV): equal to $FCV_L$ will be output for frequencies less than or equal to $FS_L$; equal to $FCV_H$ will be output for frequencies greater than $FS_H$; and intermediate values are linearly scaled between $FCV_L$ and $FCV_H$. For an inverse scaling $FCV_H$ may be assigned a value less than $FCV_L$. Referring to FIG. 12, the amplitude of the spectral peak may be similarly scaled to a control number (step power) using an amplitude scale factor having an upper and lower amplitude, $VS_H$ and $VS_L$, and an upper and lower control value, $ACV_H$ and $ACV_L$.

Alternatively, non-linear scaling such as logarithmic or exponential functions may be used. In addition to the spectral peak, other parameters may be used either with scaling or without scaling. In the preferred embodiment, FCV and ACV are kept to within a range of 0–127.

Total Power 503

The total power in the spectrum (spectral power) may be calculated by summing the magnitude of each spectral component, i.e., the sum of all of the coefficient magnitudes within the frequency spectrum of interest, the entire frequency spectrum from 0 Hz to the Nyquist frequency which is one half of the sampling frequency may be used or the spectrum may be filtered first as described above.

Power in Each Band 504

The spectrum may be divided into several different frequency bands, for example, Delta=0–4 Hz, Theta=4–7 Hz, Alpha=8–12 Hz, Low Beta 12–20 Hz, Medium Beta 20–25 Hz, and High Beta25–60 Hz. The power in each band (band power) may then be calculated by summing the magnitude of the spectral components in each band. The present invention places no limitation on the band definitions. Therefore, any size or number of frequency bands may be used.

Relative Band Power 505

The actual signal levels vary from person to person, sometimes widely. A professional football player may have much greater muscle activity signals than an elderly shop clerk. The band power and spectrum power may therefore be used to calculate the relative band power, i.e., the power in each band relative to the spectrum power. The relative band power may be calculated by dividing each band power by the spectrum power.

Median Band Frequencies 506

Another useful control parameter is the median frequency either in the spectrum (median frequency) or in each band (median band frequency). The median frequency, may be defined as the frequency in the spectrum or band of interest below which half of the spectrum or band power resides and above which half of the spectrum or band power resides. To calculate the median frequency in a band, the band power is divided by 2 and then the magnitude of each spectral component in the band is summed, beginning at the lowest band frequency and working towards the highest band frequency, until the sum reaches half the total band power. The frequency at which this condition is met is the median band frequency. The same procedure may be used to calculate the median frequency for the spectrum by substituting spectrum power for the band power and starting at the lowest frequency in the spectrum.

Using the median frequency or the median band frequency in conjunction with other control parameters raises the level of confidence in identifying specific activities. For example, the lowered forehead produces median frequency around 25 Hz, and the raised forehead produces a median frequency around 35 Hz. These median frequencies do not vary appreciably between individuals making them ideal control parameters.

Parametric Rate of Change 507

The various control parameters, e.g., the frequency and amplitude of the spectral peak, the spectrum power, band power, relative band power, median frequency, and median band frequency values, may also be compared with the respective control parameter values calculated for previous epochs. In another embodiment of the present invention the slope of the linear regression line and the standard deviation over a number of previous epochs is calculated. Ten epochs may be used. Alternatively, a least squares or Gaussian quadrature method may be used. The slope is used as a measure of the rate of change of each parameter over time. If, however, the standard deviation is greater than some percent of the change observed, e.g., twenty percent, then the slope is ignored because the variability is considered too great for there to be a reliable measure of the control parameter's change in time.

The control parameters obtained from analyzing each epoch may be mapped directly to codes (also called command codes) which are used by the control system such as digital video, video games, movies, interactive environments, virtual environments, alarm systems, or other devices or systems, to control its operation. Alternatively, the control parameters may be compared to baseline parameter values to remove the inter-subject variability for subsequent mapping to control codes.

Baseline Calibration

A table of baseline values for the control parameters may be generated representing the baseline activity for the subject, i.e., the person, animal, or plant interacting with the system. The baseline values may then be used for comparison with each parameter set calculated from each epoch. The results of this comparison allows particular states of mind, emotions, or other responses to be identified and converted to command code signals to control a given system, for example, games, movies, computer animation, devices and the like.

A human subject may be asked to relax for a period of time, e.g., 10 seconds or 5 minutes, and the control parameters for several epochs may then be calculated based on samples from that period. The control parameters obtained may then be averaged to produce the baseline values. The relaxation period and the number of epochs can be varied. As discussed further below, the subject may be asked to perform a variety of tasks in order to calculate and establish specific baseline values. One example may be to stimulate anger in the subject for later detecting that specific state of mind. Individual baseline values are useful to compensate for the variability between different subjects. The following examples are illustrative of the use of baseline values for control. Alternatively, for plants, the baseline may be obtained by removing all stimulus, e.g., light, noise, or the presence of animals, etc.

In a headband configuration, the spectrum power value can be used to quickly distinguish between different types of frontalis muscle movement. No movement is represented by the baseline measured when the user is relaxed. When the forehead is contracted downward toward the eyes, the total spectrum power is about 4 to 7 times the baseline spectrum power. A raised forehead can produce a spectrum power of 9 to 15 times the baseline value. Sustaining either of these muscle movements is simple and therefore can be used as a reliable control mechanism. Transitions between these three states (relaxation, raised forehead, lowered forehead) can also be recognized and thus used as a further control mechanism. The transitions may be recognized using the parametric rate of change of the spectrum power from previous epochs. An FFT length of 128 samples has been found to work well for recognizing such transitions.

The band power may be used to distinguish eye movement, EEG, and muscle activity. Eye movements produce signals in the delta band, 0–4 Hz. Subtracting the delta band power from the spectrum power yields a control value that is more accurate than spectrum power alone for detecting other muscle such as forehead movements without interference from eye movement signals. The spectrum power relationships discussed in connection with raising, relaxing, and lowering the forehead also hold true using:

$$P_{SPECTRUM} - P_{BAND\ (delta)}$$

as the control parameter.

To more reliably distinguish various types of muscle activity, the power in the individual bands (band power) can be compared to each other. For example, a raised forehead shows as an increase in power in the 30 to 45 Hz band, the lowered forehead shifts the power to the 20 to 35 Hz band, and a relaxed forehead shifts the power to the 0 to 10 Hz band.

The eye movement may also be used as an effective control parameter. Fast, controlled eye movements almost always creates a clipping condition. If the clipped values are not replaced by zero $\mu$V values, the power spectra will reveal the strong eye movements, represented by enormous spikes in the low frequency range. Weaker (non-clipping) eye movements can also be used as a control parameter. This is particularly relevant in interactive sleep environments where the present invention may be used to provide stimulus to a subject after he or she enters into a dream state. During a dream state, rapid eye movement ("REM") is continuous, but the lower signal intensity during sleep does not create clipping conditions. See the REM trigger discussion below.

The strength of brainwave signals (EEG) is much lower than that from muscle or eye movement. If the muscles are relaxed, and the eyes are still, the headband electrode configuration can be used with the present invention to detect various states of mind. Activated alpha waves tend to produce electrical signals that are more powerful than any other brainwaves generated, about 3 times the baseline spectrum power level. Beta waves will generate about 2 times the baseline spectrum power level. The spectrum power parameter should be used in conjunction with the other control parameters to distinguish alpha and beta activity.

In brainwave (EEG) measurements, it is important to examine the different bands. Alpha waves (8–12 Hz) are typically present by themselves in meditative states, but when the subject is concentrating on a task, alpha waves are present in conjunction with beta waves (13–60 Hz). Theta waves (4–8 Hz) dominate during sleep. Beta waves in the absence of alpha and theta waves are indicative of states of concentration. Beta waves at band power levels of two to three times baseline activity are indicative of anger or worry in the subject.

Muscle movement is easier to use for voluntary control than brainwave states because most individuals already know how to voluntarily control their muscles. Voluntary control of brainwaves, however, requires training. Alpha training has a long history in the biofeedback community, and has been shown to require diligence but no special talent. Such training, however, is not desirable for plug and play consumer applications or monitoring consumer response to stimulus. In the present invention, emotion-based control is preferred because most people can exhibit a wide range of emotions without training. For example, most people know how to get angry or to worry, and can do so on demand, with no learning required. By measuring an individual's baseline activity for such states the respective emotions can be detected during operation of the system and accordingly used for control. This process may be extended to include many states of mind or emotions.

Auto Calibrate

Rather than specifying a predetermined parametric threshold or range of values for control in an interactive movie script (described below) or in a game or other control environment, an auto calibrate feature may be used. For example, a moving average of the measured parameters over time may be used as scaling factors. Then, a linear control range for the measured parameter may be maintained despite large changes in the magnitude of the control parameters or derived from the subject over time.

Output Control 509

After an event has been recognized (through the control parameters), it is translated into a type of control signal, (i.e., a command code). For example, in a simple three button game system, a relaxed forehead state may be mapped to represent "no buttons pressed", a raised forehead may be mapped to "button A depressed", a lowered forehead may be mapped to "button B depressed", and a transition between raised and lowered forehead may be mapped to "button C depressed".

Alternatively, the relaxed forehead state may be mapped to the A button, with all other states mapped as no action codes i.e., no buttons pressed. In both configurations, the direction of the game character can be controlled by hand. More complex sets of events, including emotions, could be mapped to include all of the game controls.

Referring to FIG. 1 and FIG. 8, one-byte digital control codes representing the detected events are transmitted from serial port 59 of computer 50 to the interface 60. Interface 60 can be electrically connected in parallel to the buttons of game controller 71 through the I/O (input/output) interface 63 in the preferred game embodiment. In response to the control codes received from computer 50 via the serial interface 61, microcontroller 62 effects the opening and closing of the respective game-controller-button circuits. In this way, the interface 60 controls video game 70.

Mind Select

One example of a control system in accordance with the present invention is a substitute for a computer mouse using mind select triggers. In one embodiment, the amplitude of the spectral peak is mapped to a pointer which moves from option to option on the display. The option being pointed at is highlighted on the display. A command appropriate for selecting the pointed option is sent to the computer operating system when the selection is confirmed. Confirmation may be made by the occurrence of predetermined event within a fixed period of time after the pointer stabilizes on the highlighted option. For example, a quick eye movement to the left or right causes a large amplitude signal (greater than a fixed threshold) in the 0–3 Hz band. Such an event occurring immediately after the pointer stabilizes on an object may be used to confirm the object selection.

Interactive Movie Control

Another embodiment of the present invention may be used to control various aspects of movies, motion pictures, digital video, multimedia demonstrations, virtual worlds, and other interactive environments which will be collectively referenced below as movies or interactive movies. One illustrative system shown in FIG. 3 uses an Apple 9500 PowerMac model computer system as a platform for controlling interactive movies. In this embodiment, the biosignals are picked up, amplified, filtered, digitized, and transmitted to computer 50 by the IBVA in the manner previously described. The samples are also converted to control parameters and subsequently converted to control codes in the manner described above in connection with FIG. 9. The control codes are then sent to a movie script interpreter application which is preferably running concurrently on the computer 50. The Apple operating system is used to search for and display specific video frames and frame ranges which may include additional specific audio, textual, or graphic segments. The frame images, sound, etc. are stored in an indexed file which may be randomly accessed.

An interactive movie script or artificial intelligence may be used to control the selection and sequence of frame sets, selecting the range of frames within a set to be played, the direction (forward or reverse) for playing the selected frames, and the rate (slow to fast) at which the selected frames are played in the movie. The script is interpreted by an "orchestrator". The commercial IBVA product is currently shipped with an orchestrator called Step One. The present version of the Step One source code written in the Lingo programming language by Macro Media is contained in the attached software appendix filed herewith. An interactive movie may be created by using a script that is responsive to the emotional or state of mind response of the subject viewing the movie.

Branch Control

The script may specify for each frame set, one or more control parameters to be evaluated at the start of the set and the scenes that may be selected using those control parameters. For example, consider a frame set S1 comprising three possible scenes A, B and C. A schematic representation of set S1 is shown in FIG. 13 and a branch or flow diagram for set S1 is shown in FIG. 14. As shown in FIG. 13, the script for set S1 specifies that the selection of scenes A, B, or C is determined according to the frequency of the spectral peak in the 8–12 Hz frequency range. As discussed previously, the polar FFT data is passed through a frequency filter (8–12 Hz) and the frequency of the spectral peak is determined and scaled. On a 0–127 scale for the frequency control value (FCV): scene A will be played when the FCV is in the 0–42 range; scene B will be played when the FCV is in the 43–85 range; and scene C will be played when FCV is in the 86–127 range.

Referring to FIG. 13, the script defines scene A as comprising frames 0 to 100. Similarly, scene B comprises frame numbers 101–200 and scene C comprises frame numbers 900–1000. The script also specifies the set to be played after each scene. As shown in FIG. 13 and FIG. 14, Set 2 follows scene A; Set 10 follows scene B; and the movie stops after scene C is played.

For example, a script may play a sequence of frames showing three characters. The emotional reaction of the viewer to the scene may indicate more interest (or other emotional reaction to, e.g., anger) in one of the characters than the others. The script may then branch to a scene involving that character thus maintaining or even increasing the viewer's interest or other emotional state.

Although the frequency of the spectral peak was used in the above illustration, any control parameter (or set of control parameters) may be evaluated to control branching within a set, i.e., to select the scene to be played. Alternatively, each scene may have an individual set of parametric criteria that must be satisfied before the movie branches to that scene.

Time Criteria

Time criteria may be specified in addition to the above described use of one or more control parameters. For example, the script for a particular scene may require that the selected control parameter (e.g., the amplitude of the spectral components in the low beta range) exceed (or not) a threshold (or fall within a specified range) for a specified time period before branching to that scene. It is to be understood that multiple control parameters can be used with associated time criteria.

Additionally, a delay may be specified which causes the movie to pause for the specified duration before proceeding to the next scene or set. Such a delay may be used, for example, to wait for a change in the subject's emotional state, which change then directs the branching of the movie to the next scene.

Compare Criteria

Figure 15:
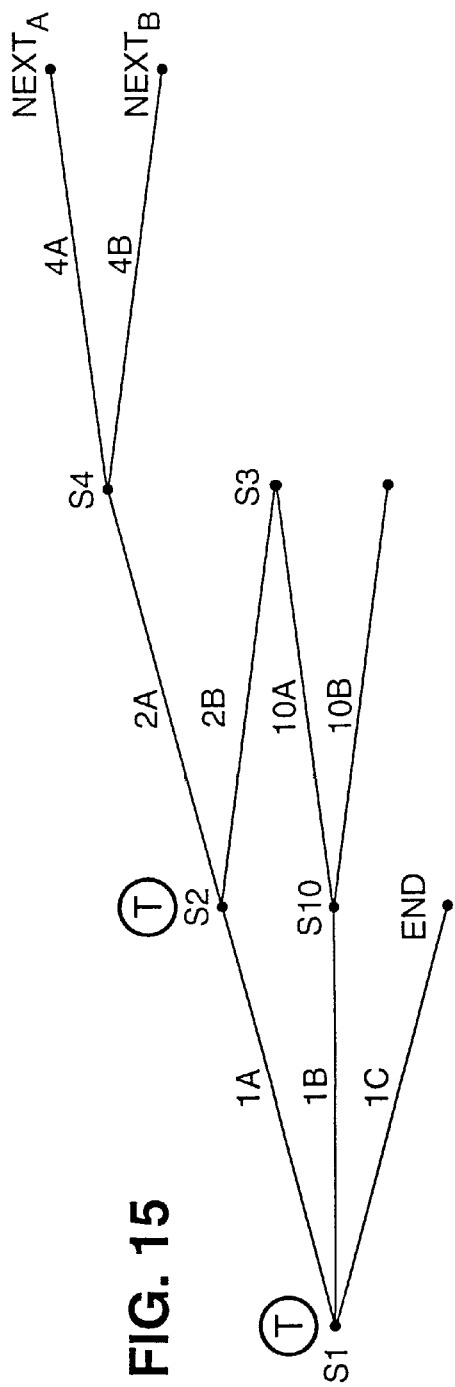
FIG. 15 is a schematic flow diagram of a script for an interactive movie.
Figure 16:
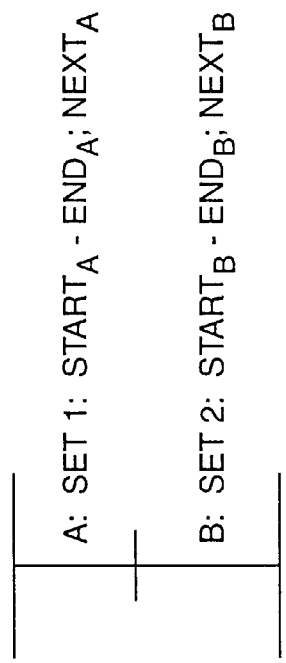
FIG. 16 is a schematic representation of a script for a comparison set in the interactive movie depicted in FIG. 15.

The script may also "tag" two or more sets and their respective control values (those used to select the scene within the tagged set) for subsequent comparison. A subsequent set may perform a comparison of the tagged control values to select a scene within the comparison set. A schematic of an example compare set S4 is shown in FIG. 16 and the flow diagram is shown in FIG. 15. The script for set S4 finds the previously tagged set which had the smallest control value in comparison with the other tagged sets, and branches accordingly. Referring to FIG. 15, sets S1 and S2 were designated as tagged sets. If set S1 had the smallest control value, then scene A is played. If S2 was the smallest, then scene B is played. Alternatively, the largest control value, or a median or average control value in the tagged set can be used. Multiple tags can be used such that with one form of tag, once the tagged set is analyzed, the tags are erased. A second form of tag can be a permanent tag, which is always used, or semipermanent tag which is used for some selected number of times before being erased.

Triggers

The script may also specify that playback should halt until a specified criteria is satisfied. One example is a rapid eye movement ("REM") trigger, which is particularly useful for use with interactive dream movies or for triggering dream stimulus. In the case of a REM trigger, playback waits until the FFT amplitude in the 0–3 Hz, remains within a 15–20 $\mu$V range for at least 3 minutes. REM triggers allow the present invention to be used to control stimulus that may be provided or altered only after the subject enters the dreaming state. One example may be to provide an audio suggestion for a particular dream topic. Of course, any combination of parametric criteria may be specified for use as a trigger. Another example may be to wait for the beta band power and the median beta frequency to exceed thresholds indicating the viewer is paying attention.

Output Control

In addition to specifying a range of frames to be played, various output signals may be activated by the script. For example, the script may output a code to control the lights in a room or a sound or motion generator to provide further stimulus or distraction to the user. For example, consider a scene in a thunderstorm where the subject exhibits a state of fright below a certain level, and the control system outputs a code to flash a room light in time with a display of lightening to increase (or not) the subject's level of fright. Another technique which may be designed to increase tension in a game playing subject involves slowly increases the pitch (or volume) of a background audio track.

Variable Frame Range Mapping

As shown in FIG. 13 and FIG. 16, a range of frames to be played is specified for each scene. Normally, the entire frame sequence specified will be played. However, the script may specify a control parameter to be measured and mapped to the frame range. The mapping may be linear, non-linear, random or otherwise. Then the sequence of frames from the first frame to the mapped ending frame may be played for the scene. Consider a sequence of frames from 1000 to 2000 mapped to the frequency of the spectral peak in the 0–50 Hz frequency range. A frequency of 50 Hz is mapped to frame 2000 thus causing the entire sequence (1000–2000) to be played. By comparison, a frequency of 10 Hz is mapped to frame 1200 thus causing only frames 1000–1200 to be played.

After the mapped sequence is played, the script may specify the next set to be evaluated. Alternatively, the frame sequence may be played forward and then return to the starting frame playing the sequence backwards, e.g., forward from frame 0 to frame 1200 and then backward from frame 1200 to frame 0. In yet another embodiment, the script may repeat the set with each new control value, or alternatively branch to the next set, or wait for a trigger as desired by the script author.

Direct Mapped Frames

In a modification of the variable frame range mapping, a single set and scene having a fixed range of frames may be used. In such a case, each FFT epoch is used to find the destination frame as described above (e.g., 2000 for 50 Hz, 1200 for 10 Hz). In this mode, however, the movie plays from the current frame toward the destination frame until the next FFT epoch produces a new destination frame. Then the movie plays sequentially from the current frame position toward the next destination which may be forward or backward relative to the current frame position. The movie may operate in an endless loop or a trigger or other event may be used to branch out of the loop. It will be appreciated that each new control value may be sent before the destination frame is reached in which case the destination frame may never be played.

Rate Control

The speed and direction of playback may be controlled independently of other aspects of the movie using any parameter desired. Using the frequency of the spectral peak again as an example, the frequency control value may be used to set the playback speed by mapping it to the frame rate. For example, $FCV_H$ may be fast and $FCV_L$ may be slow. Alternatively, $FCV_H$ may be fast forward with $FCV_L$ being fast backward. It will be appreciated that any number of speed and direction mapping possibilities may be used.

In addition to using signals from a single subject, signals from many subjects may be combined and the results may be used to control a movie or other stimulus as described above. The combination techniques may include amplitude averaging, frequency band division or such other weighting or mediation algorithms that one skilled in the art can provide. One example is to allow two subjects to "mentally" compete. Using one or more of the above-described control parameters, the subject with the higher (or lower) value for the control parameter wins for that epoch.

Figure 3:
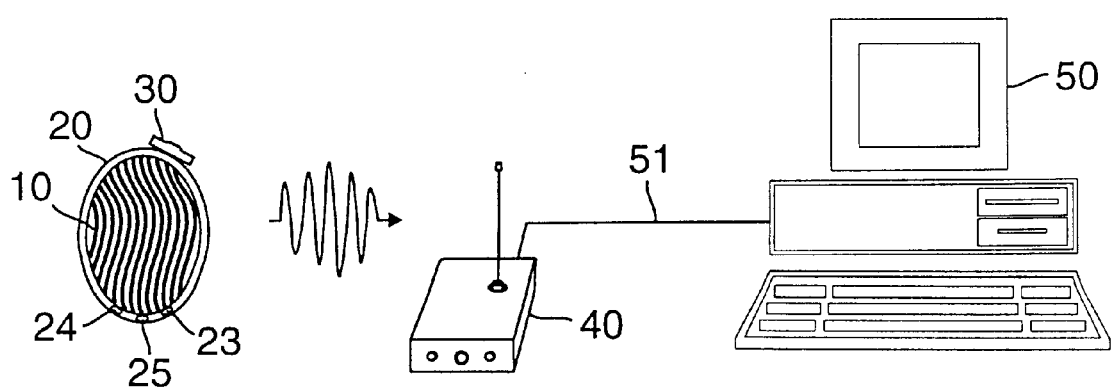
FIG. 3 is a block diagram of another embodiment of the present invention in an apparatus for controlling digital video, multimedia, motion pictures, movies, or other interactive environments.

The present invention can, in a preferred embodiment, comprise a plurality of individual systems such as is illustrated in FIG. 3, so that the states of a plurality of beings are monitored and used to obtain a result in the control system. In one example, the determined mental and emotive states of the many beings can be used to survey viewers' reactions to a show, such as a television program or a movie or a multimedia presentation. Using an appropriately programmed computer 50 to acquire the bio-signals and process the signals to develop the control parameters in real time as discussed above, the computer 50 can then either record on a storage media or transmit by wire or radio waves either the control parameters or subsequently obtained command codes to a central data collection agency, such that a rating of the consumers' likes and dislikes can be determined. Whether control parameters or command codes are provided by computer 50 depends on how and in what form the central data station wishes to combine the data. This decision also will determine whether the command codes are to be generated locally by the system or remotely by the central data station.

In such case, this embodiment of the present invention can be used to supplement or replace the well-known Nielson ratings and other consumer survey collection techniques that are commonly used to test consumer reactions to presentations.

In a like manner, such a system can be used in connection with "focus groups", a technique well known in marketing products to consumers, to ascertain the focus group participants subjective mental state response to the presentations and discussions, to supplement the individual's subjective input.

In connection with these consumer survey implementations of the present invention, the real time acquisition of the parameters representing the determined state of the individuals can be electronically correlated or indexed to the medium being presented, for example, a frame (or scene) of a movie or the time of presentation of a particular display or comment, or the index of a musical score, so that particular likes and dislikes, comforts and discomforts can be detected. This information advantageously can be used by the creator of the show or presentation being evaluated to revise the same to achieve a more desired end result on the individuals. This information can be collected in real time by a central station over a network, such as a local area network, a wide area network, or a Net such as the Internet, America On line, World Wide Web, etc. Alternately, the information can be collected locally by each computer 50 on media such as a computer disk or tape (magnetic or optical media) or other storage device, and mailed to the data collection center for remote processing and compilation of the results.

The use of a network or Net interconnection also permits the exhibition of interactive movies or shows in the home in real time. With the emerging technology in television cable systems, it is envisioned that an alternate embodiment of the present invention can be coupled to an intelligent cable box for transmitting the data to the cable system operator, or to some other station for processing, combining and mediating the data acquired for controlling the interactive movie. Thus, large numbers of individual viewers can be interactively connected in real time. Such an interactive network or Net interconnection also allows for interactive game playing by two or more individuals over a network or Net, in which the combination and/or mediation of control parameters or command codes determines the sequence of play of the game.

Presence Detection

Figure 17:
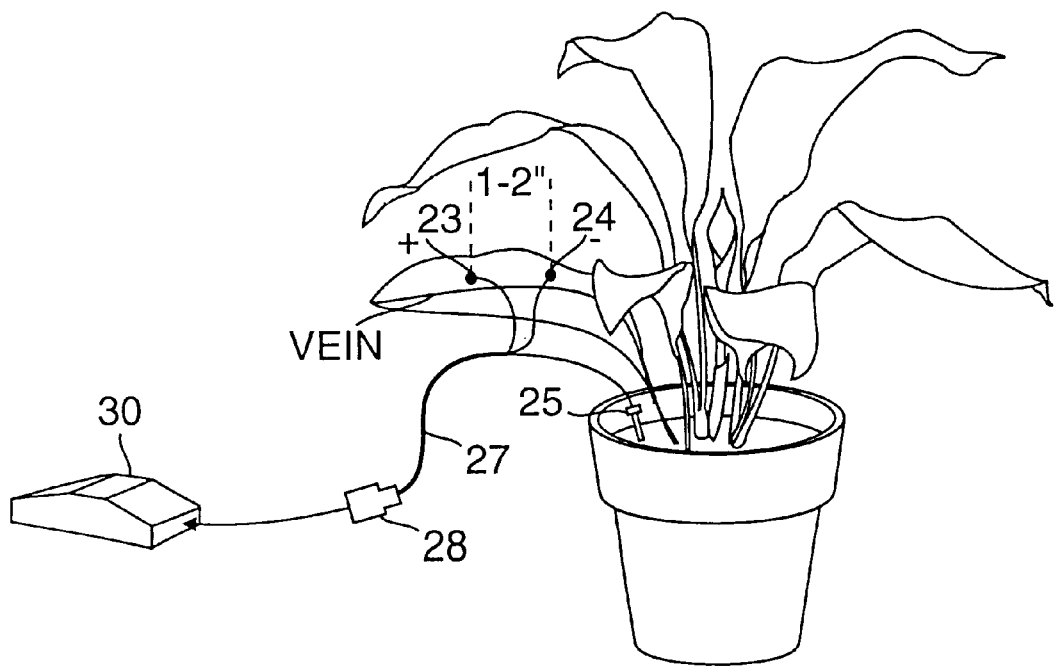
FIG. 17 shows connection of the IBVA transmitter to a plant for use in an alarm system embodiment of the present invention.

Referring to FIG. 17, an alternate embodiment of the present invention directed to an organic presence detector is shown. The IBVA transmitter 30 is used to sense, digitize, and transmit bio-signals from plant appendages such as a leaf or stem as described above. Two electrode configurations work well, in which the positive and negative electrodes are attached to a leaf within one to two inches of each other and on the same side of the leaf vein as shown in FIG. 17. The neutral electrode is then attached to a nail in the soil or alternatively not connected. Gel electrodes attached to a clean dry leaf will provide a good signal for extended periods of time, such as several months.

Using the control parameters discussed above, the control system determines when the bio-signals from the plants corresponds to an agitated state. In this way the plant can be used as a presence detector which becomes agitated as a person or other subject passes or interacts with the plant. Although the parameters may change from one plant to another, the baseline values for an individual plant are easily obtained. One plant tested with the present invention showed a substantial amplitude (30–40 μV) in the low frequency range (0–5 Hz) and an increase in median frequency (to 11 Hz) with agitation.

Alarm System

A system which monitors plants may be used as an alarm system in which the agitated state corresponds to an intruder.

With many plants spread through a building, the location and movement of an intruder may be monitored and can be used as a control switch for a series of surveillance cameras. By sensing the control parameters from a plurality of plants, the degree of agitation and the direction of agitation, can be determined based on predetermined locations of the plants being agitated. The movement can be tracked by monitoring the order in which plants are agitated. The pattern of control parameters can be used to determine with high reliability both the presence and direction of an intruder. Moreover, it is believed that such an alarm system is one that cannot be circumvented by the intruder because the intruder will necessarily agitate the plants before reaching a location wherein the alarm can be circumvented.

Appliance Control

Figure 18:
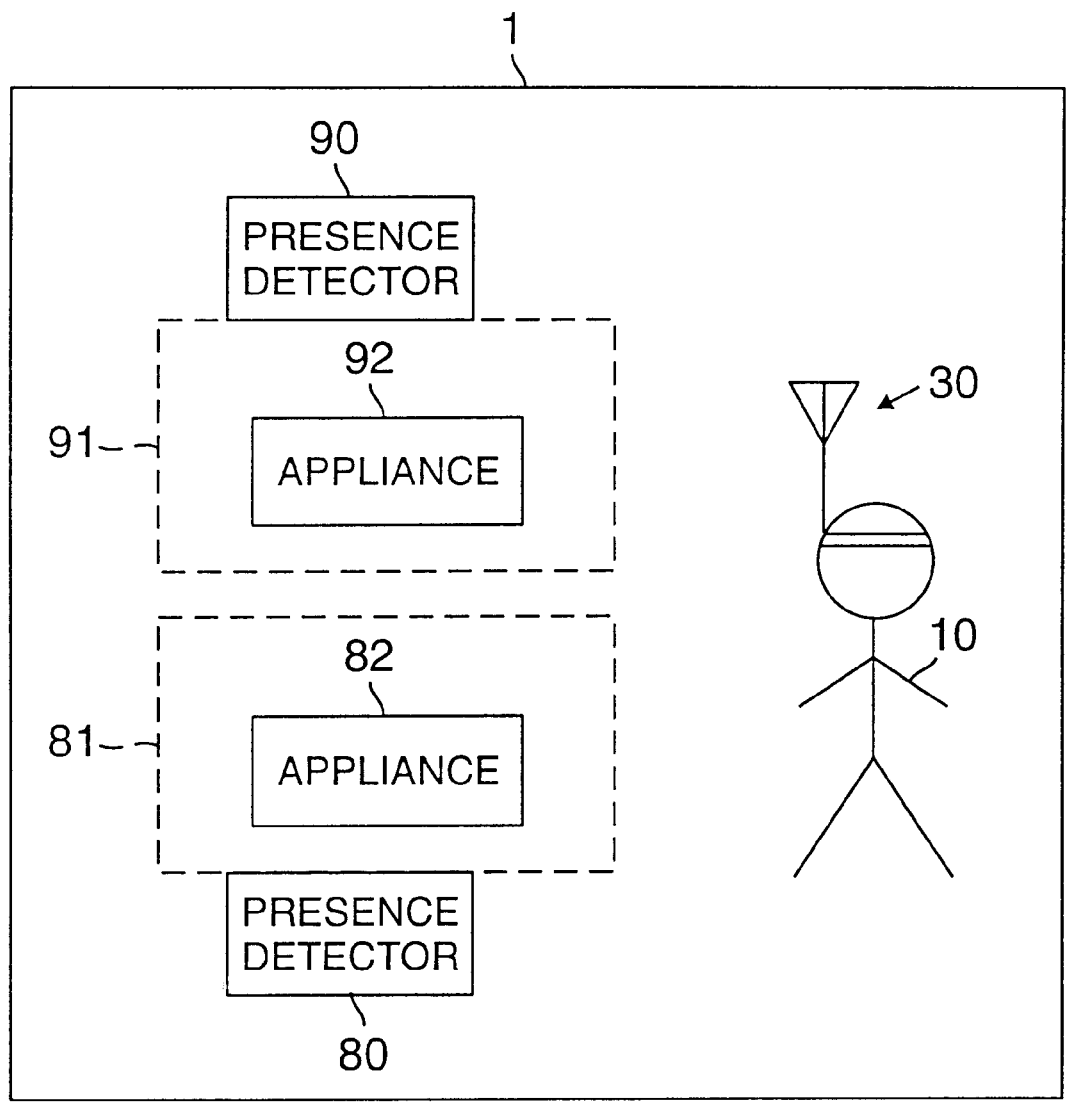
FIG. 18 is a schematic plan view of a space containing appliances controlled by bio-signals picked up from a subject moving through the space.

Presence detection may also be used to facilitate control of a plurality of appliances or objects in a real or virtual space. Referring to FIG. 18, two appliances 82 and 92 are shown in a large space or room 1. Appliances 82 and 92 are located in areas 81 and 91 shown by dashed lines. Areas 81 and 91 are monitored for the presence of a subject 10 by presence detectors 80 and 90, respectively.

Subject 10 wears an IBVA transmitter 30 and headband for controlling the various appliances in room 1. Bio-signals from subject 10 are transmitted to all of the appliances, 82 and 92 in this example. Using area 91 as an example, as subject 10 approaches appliance 92 presence detector 90 detects that subject 10 satisfies a predetermined relationship with appliance 92 and sends a signal to a controller (not shown) associated with appliance 92. As described in further detail below the controller is enabled to receive and analyze the digitized bio-signals from subject 10 while subject 10 satisfies a predetermined relationship with area 91. While enabled by presence detection, the controller calculates frequency domain control parameters using predetermined criteria for the control of appliance 92. Subject 10 is thus enabled to manipulate or control a plurality of appliances while moving throughout the room or space 1.

Figure 19:
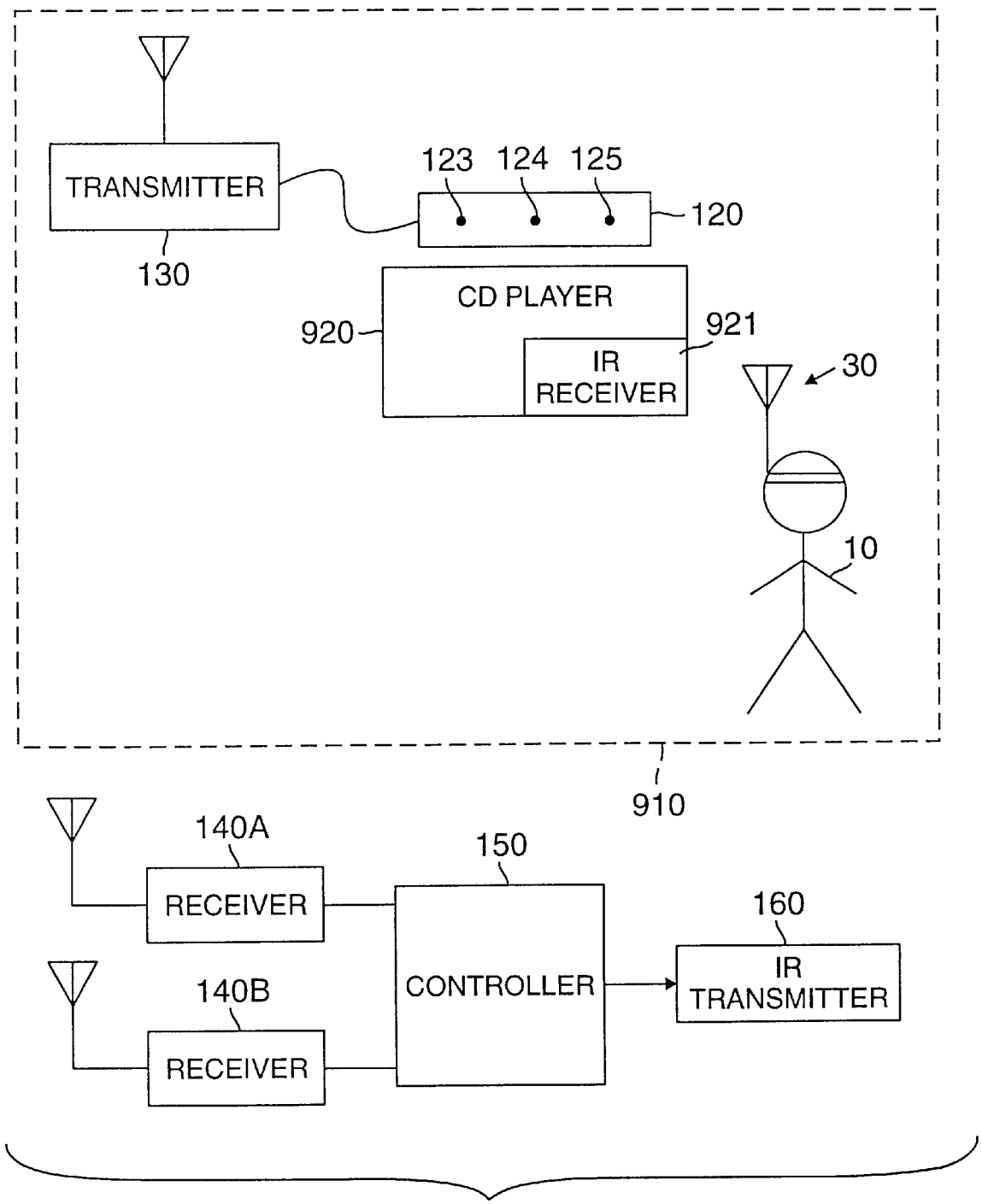
FIG. 19 is a functional block diagram of a compact disk player control system for use with the system of FIG. 18.

The control system will be described in greater detail in conjunction with FIG. 19. Block 920 in FIG. 19 schematically represents an ordinary compact disk player ("CD") 920 having an infrared receiver 921 through which remote commands may be received and processed. An IBVA transmitter 130 is connected to sensors 123, 124, and 125 in headband 120. The headband 120 is placed on or near the CD player with the sensors facing the monitored area 910. The signals from sensors 123, 124, and 125 are transmitted from IBVA transmitter 130 to receiver 140A on a frequency that will be referred to as channel A for convenience.

An IBVA transmitter 30 worn by subject 10 transmits bio-signals sensed from subject 10 to IBVA receiver 140B over channel B. Controller 150 receives digitized samples from receivers 140A and 140B and performs FFT calculations on the data. To send control signals to CD player 920, controller 150 outputs signals to infrared transmitter 160 which are picked up by infrared receiver 921. Alternatively, a wired control network such as the household networking protocol (X10) or radio frequency control signals may be used.

When a subject 10 moves into the controlled area, sensors 123, 124, and 125 sense the biological activity of the subject. The digitized samples from receiver 140A (the "channel A samples") are analyzed by controller 150 which performs FFT calculations examining the frequency domain parameters for the presence of a biological entity such as a subject 10. Any suitable control parameter may be used, however, the present system has been operated using a step power (ACV) range of 101–127 to detect the presence of subject 10 in the control area. The step power (ACV) is calculated as described above in connection with FIG. 11. In response to a step power value in the range of 101–127 on the channel A samples, controller 150 recognizes the presence of subject 10 in area 910. Thus, the channel A samples are used for presence detection and may be called the PD samples.

While the subject 10 is in area 910, the controller 150 performs FFT calculations on the digitized samples from receiver 140B (the "channel B samples") which represent the bio-signals from subject 10 being sensed by IBVA transmitter 30. The power spectra calculated from the channel B samples are used for control and may be called the control samples. Control parameters are generated from the control samples and mapped to the desired CD player controls. Any desired control parameters and mapping schemes may be used. One successfully implemented mapping scheme uses the step power (ACV) parameter to control the CD player. A step power value in the range of: 0–24 is mapped to the select current track −1 (track backward) command, 25–63 is mapped to a do nothing command, 64–99 is mapped to the select current track +1 (track forward) command, and 100–127 is mapped to the start play command. Additional commands may be implemented using the same or different control parameters. A verification and execution command may also be implemented using additional control parameters.

REM detection may be used as a convenient trigger to interrupt a previous command being processed. A waking state REM trigger may use different parameter levels than a sleep state REM trigger. For example, the amplitude range for a waking state trigger may be set to the 40 to 50 $\mu$V range, the time criteria may be reduced to 4 seconds, and a minimum number of hits may also be specified. In this example, one hit is counted for each FFT epoch having 40 to 50 $\mu$V peak in the 0–3 Hz band. If the total number of hits in the 4 second period meets or exceeds the minimum, then controller 150 recognizes the REM trigger. Upon detecting a REM trigger, controller 150 may issue a stop command to CD player 920 terminating a previous play or other command. The controller then recalculates the control parameters using new control samples and selects a new command based on the new step power value.

Alternatively, the step power parameter may be mapped directly to specific track numbers. In this example, the 0–127 range of the step power (ACV) parameter is divided by the number of available CD tracks. Each increment is mapped directly to a track number. For example, an eight track CD may have the first song mapped to a step power value in the range of 0–15. Similarly, a step power value in the range of: 16–31 may be mapped to track 2, 32–47 may be mapped to track 3, 48–63 may be mapped to track 4, 64–79 may be mapped to track 5, 80–95 may be mapped to track 6, 96–111 may be mapped to track 7, and 112–127 may be mapped to track 8. A portion of the range such as 101–127 may be reserved for confirmation and execution of the selection. In that case, the above track mapping ranges would be scaled down to the 0–100 range.

When the subject 10 leaves area 910, the controller 150 recognizes using the PD samples that the subject is no longer present and thus no longer processes the control samples for the CD player control system. No further commands are directed to CD player 920 by controller 150. When the subject is detected by another presence detector, the controller 150 begins analyzing the control samples for control of the appliance associated with the respective monitored area. Each appliance may use unique control parameters or mapping schemes. In the case of different mapping schemes, controller 150 will analyze the control samples differently for each appliance using the respective control parameters and mapping scheme.

It will be appreciated that a central controller may be used in combination with several presence detectors to control a plurality of appliances. Alternatively, a small unsophisticated controller may be provided for each appliance. Additionally, many different types of appliances such as lights, electronic equipment, air conditioning, robots, cameras, and so on may be controlled.

Although presence detection using IBVA units alone or in combination with plants have been described, it will be appreciated that a great variety of presence detectors such as infrared, ultrasonic, capacitive, and inductive sensors may be used. Alternatively, one or more surveillance cameras and image interpretation algorithms may be used to monitor a room or area associated with several controlled appliances. In the case of a single device monitoring several areas, the controller would activate the control algorithm associated with the appliance.

Figure 20:
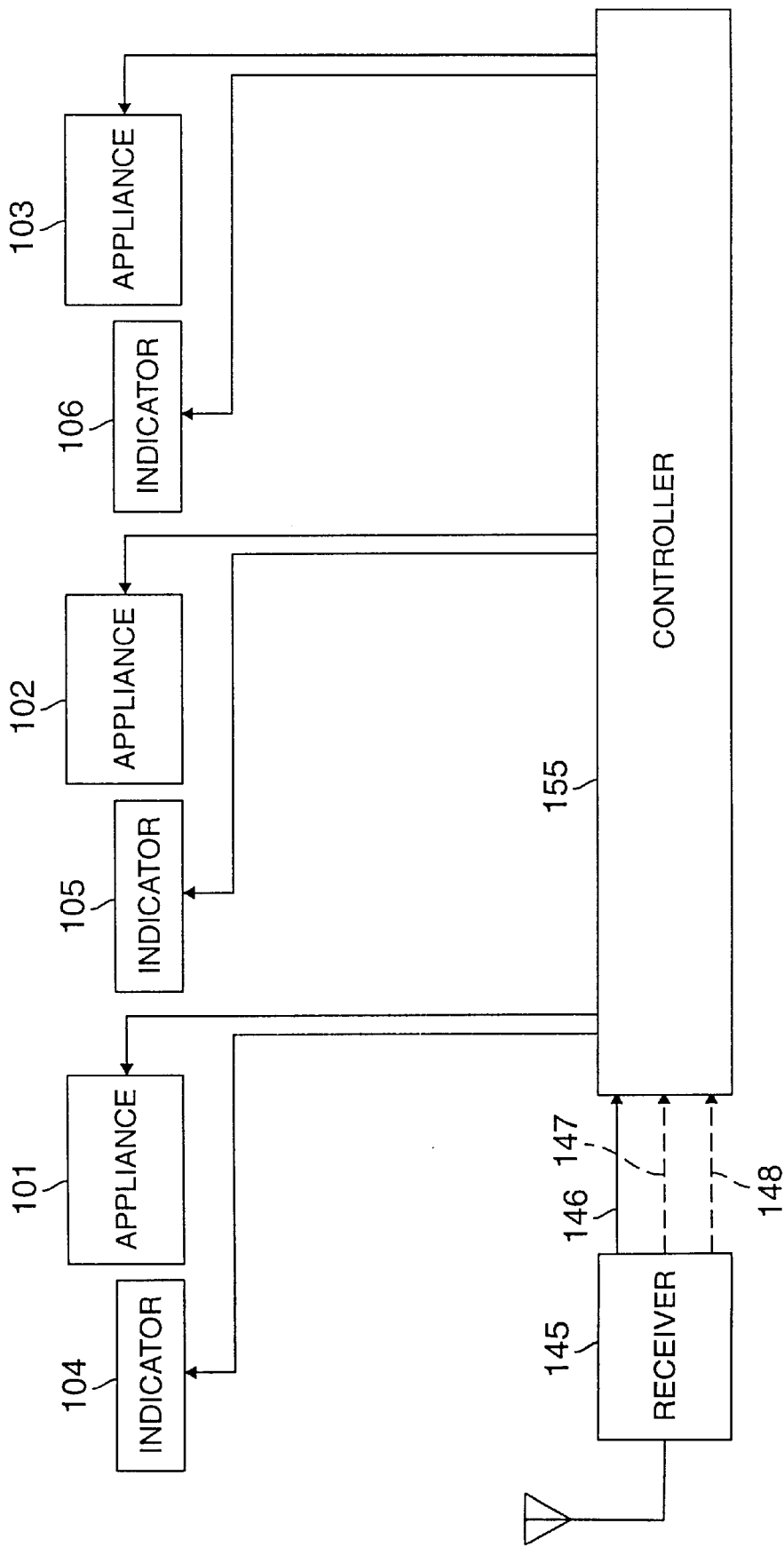
FIG. 20 is a functional block diagram of a multi-subject and multi-appliance control system.

An alternative to the presence detection based control system is schematically shown in FIG. 20. Three appliances 101, 102, and 103 are connected to receive control signals from controller 155. Controller 155 may also be connected to indicators 104, 105, and 106 respectively associated with appliances 101, 102, and 103. A receiver 145 provides controller 155 with the digitized samples i.e., the control samples, which controller 155 analyzes. Receiver 145 may be a multi-channel receiver (two additional channels schematically represented by dashed lines 147 and 148) using frequency division, time division, code division, or any other multiplexing scheme to receive digitized samples from several subjects simultaneously. In the case of a multi-channel system, the control samples from each subject may be separately analyzed by controller 155 as further described below.

The system of FIG. 20 may be operated in two different ways. A first method employs a phenomena in which the sensed EEG signals of a subject contain a significant frequency component or peak in the frequency spectrum corresponding to the frequency of a stimulus being observed by the subject. For example, the EEG of a subject observing a light flashing at 20 Hz will contain a large 20 Hz component in the frequency domain. The system of FIG. 20 may use this phenomena to select a specific appliance for control by causing each indicator 104, 105, and 106 to flash at a unique frequency. Assume for purposes of illustration that indicator 104 (next to appliance 101) is set to flash at 10 Hz, 105 (next to appliance 102) is set to flash at 20 Hz, and 106 (next to appliance 103) is set to flash at 30 Hz. Whenever a subject observes one of the indicators, the control samples from that subject will contain the frequency component corresponding to that indicator and its associated appliance. Control parameters at each of the assigned indicator frequencies may be calculated and used to perform the appliance selection in place of the presence detectors. In this example, the band power and relative bond power in each of the bands centered at the indicator frequencies (10, 20, 30 Hz) may be used as device selection parameters. Additionally, time criteria may be specified for added reliability. For example, the device selection parameter may be required to satisfy certain thresholds for a minimum of one second. Thus, the subject can select the appliance for control by simply looking at it, or more specifically, its indicator. While the device selection parameters satisfy the selection criteria, controller 155 calculates and maps the control samples into control commands using the control parameters and mapping scheme associated with the selected appliance.

Referring to FIG. 20, the operation of a multi-channel i.e., multi-subject system will be described. In FIG. 20, three channels 146, 147, and 148 are shown. Each channel may provide control samples from one subject to controller 155. For illustrative purposes, channel 146 carries control samples from subject A. Likewise, channels 147 and 148 respectively carry control samples from subjects B and C. Controller 155 performs the FFT calculations on each epoch of control samples received from each channel. Many channels may be serviced by a single powerful processor. To facilitate multi-tasking, each channel may be buffered. The controller may then serially process an epoch of control samples from each channel as they are collected in the buffer. Alternatively, a dedicated processor may be provided for each channel.

In a multi-channel system, some method of arbitration may be provided to avoid conflicting control commands being issued by two or more subjects to a single appliance. In some applications, however, it may be desirable to allow two or more subjects to compete for control of an appliance. One arbitration scheme grants exclusive access to an appliance to the first subject to select that appliance. The exclusive access may continue for the duration of the subject's selection of that appliance.

A second method of operating the system of FIG. 20 employs the mind select scheme described above. Instead of moving a cursor to highlight an option on a computer screen, an appliance pointer moves from appliance to appliance. The appliance being pointed to is indicated by activation of its associated indicator. In this way, controller 155 may provide an indication to the subject when the appliance has been selected. The subject may then confirm the selection using any predetermined control parameter.

It will be appreciated that the above systems may be used to control various objects, appliances, or other aspects of a real or virtual space. In virtual space applications, the presence detectors may be implemented in software using the calculated position of a subject or other object within the virtual space. Once the calculated position of a subject or other object within the virtual space falls within a predetermined area, the subject's actual bio-signals may be used in the above described manner to create and control various aspects of the virtual environment. Additionally, code may be created on the fly on more advance platforms such as those available from Silicon Graphics, Inc.

The presence detector in a virtual space may monitor any type of subject, object, or parameter within the virtual environment. For example, an environmental parameter such as the wind speed or direction in a virtual space may be compared with predetermined criteria to activate the controller in place of the spatial relationship criteria described above. Thus, any threshold criteria may be specified for satisfying the predetermined relationship between a monitored subject, object, or parameter and a controlled space.

Indirect mapping may also be used. For example, bio-signals sensed from a subject may be used to control or affect the wind speed and direction which in turn may be used to determine relationship criteria for activating the controller. Once activated, the controller may use the bio-signals from the same or different subject to control the same or different objects or parameters within or outside of the virtual environment.

The above-described unique-frequency indicator or pointer-indicator techniques may also be used. Combined physical and virtual spaces may also be controlled. For example, real appliances may be controlled by manipulation of an associated facsimile or icon in a virtual space. Of course, the virtual objects may be mapped to physical systems in any desired manner.

Neural networks may also be employed to develop and recognize EEG patterns associated with an appliance. In such a system, the subject would train the system by repeatedly looking at the appliance and then away when prompted by the system. The neural network would then sift through incoming control samples looking for a match with the pattern associated with the appliance. Alternatively, the patterns may be programmed into an ordinary controller, the neural network being used for initial development of the patterns.

One real time control method responsive to digitized biological signals comprises the steps of:

a) removing from said digitized biological signals any signal sequence having a peak amplitude which exceeds a predetermined voltage range of an amplifier, to produce a filtered signal;

b) calculating an FFT power spectrum from said filtered signal, said power spectrum comprising one or more spectral components each having an amplitude and a frequency;

c) summing said amplitudes of selected ones of said spectral components;

d) calculating the total spectrum power in a selected frequency range by said amplitudes of selected ones of said spectral components;

e) calculating the band power in at least one selected frequency band by summing said amplitudes of said spectral components having frequency within said selected frequency band;

f) calculating a relative band power in at least one of said selected frequency bands relative to either of said total spectrum power or one or a combination of more of said band powers;

g) calculating a median frequency of one or more of said band powers or of said spectrum power;

h) calculating a linear regression line and slope over a preselected number of recent ones of said power spectrum for one or more of said total spectrum power, said band power and said median frequency parameters, and indicating the direction and magnitude of the change in said parameter in response to said slope;

i) calculating an estimated error for one or more said linear regression lines;

j) calculating the reliability factor for said magnitude and direction of script change in said parameter based on said estimated error; and k) encoding at least one of said spectrum power, band power, relative band power, median frequency, magnitude and direction of change, and estimated error into predetermined digital words by a mapping scheme.

The above encoding step may further comprise comparing the calculated values of total spectrum power, band power, relative band power, median frequency, magnitude and direction of change, and estimated error, parameter values with a look-up table of predetermined values for said calculated values and outputting digital words corresponding to a physiological, emotional, mental, or general state of consciousness of the subject.

The above methods may further comprise using the encoded digital words to control the interaction between the subject and a video game machine.

The above methods may alternatively further comprise using the encoded digital words to control of any a device capable of displaying a motion picture to operate at least one of the following playing characteristics:

a) the direction in which the motion picture plays;

b) the rate at which the motion picture plays;

c) the selection of the particular frame or sequence of frames that the motion picture plays;

d) selection of any order in which any frames or sequences of frames are played;

e) the order in which multiple tracks of a motion picture are selected and played;

f) the direction of a sound track;

g) the number of sound tracks which play;

h) the order and combination of sound tracks which play;

i) the synthesis of images into frames;

j) the overlaying of one or more images into frames of the motion picture;

k) the picture quality of the motion picture;

l) the size of the motion picture; and m) the sound quality of a sound track.

The step of using encoded signals in the above method may further comprise controlling at least one of the focus, sharpness, brightness, color mapping, contrast, or tint of the motion picture quality, and/or the volume, pitch, tone, direction, timbre, and signal to noise ratio of the motion picture sound track.

The above methods may alternatively further comprise using the encoded digital words to control an environment around a subject, said control including the operation of at least one of the following characteristics:

a) the intensity, color, or strobing of the lights in the environment;

b) the temperature, humidity, chemical composition, direction, and ratio of the air flow;

c) the quality, or change in quality of any motion picture track or tracks being displayed;

d) the quality, or change in quality of any sound track or tracks played in the environment;

e) the motion of or change in motion of the environment, including translational, vibrational, oscillating, or rotational motion.

The above methods may further comprise using the encoded digital words to select one of a plurality of items, wherein the plurality of items comprise one from a list, a table, or a multidimensional structure.

Although several embodiments of the present invention have been described using the IBVA transmitter and receiver, it should be appreciated that the present invention is not limited to such radio frequency carrier systems as it also contemplates directly wired electrodes, and other wireless systems such as an infra-red link.

From the foregoing description it will be apparent that improvements in physiological parameter based control systems and methods have been provided to improve the reliability and eliminate the need for subject training in active and passive systems. While preferred embodiments have been described, it will be appreciated that variations and modifications of the herein described systems and methods, within the scope of the invention will be apparent to those of skill in the art. Accordingly, the foregoing description should be taken as illustrative and not in a limiting sense.

What is claimed is:

1. A control system comprising:

at least one presence detector for detecting whether a predetermined relationship with at least one controlled space is satisfied;

at least one device having a predetermined association with said controlled space;

at least one sensor for picking up bio-signals from a subject; and a controller having a first input connected to said presence detector, a second input connected to said sensor, and an output for issuing one or more commands for controlling said device;

said controller comprising a gate responsive to signals from said presence detector, said gate being in an open state responsive to said predetermined relationship being satisfied;

said controller further comprising a FFT processor and a command map for converting said bio-signals into said commands;

said controller being operative during said open state to issue said commands to said device.

2. The control system of claim 1 wherein:

said FFT processor comprises a general purpose CPU and a control program.

3. The control system of claim 1 wherein:

said presence detector comprises an algorithm for comparing the position of an object within a virtual space with said at least one controlled space.

4. The control system of claim 3 wherein:

said at least one controlled space comprises at least one virtual space; and said at least one device comprises at least one virtual object.

5. The control system of claim 1 further comprising:

an analog to digital converter having an input connected to said sensor and an output for providing digital samples representative of said bio-signals;

said controller being operative during said open state to receive one or more epochs of said digital samples, said epochs comprising a predetermined number of said digital samples;

said FFT processor being operative during said open state to perform fourier transforms on said epochs and generate one or more control parameters;

said controller operative during said open state to compare preselected ones of said control parameters with said command map to issue said commands.

6. The control system of claim 5 wherein said control parameters comprise one or more of the following:

(a) a frequency of a spectral peak;

(b) a amplitude of a spectral peak;

(c) a frequency of a spectral peak after filtering;

(d) a amplitude of a spectral peak after filtering; and (e) a value of (a) through (d) after scaling.

7. The control system of claim 1 wherein said predetermined relationship comprises a spatial relationship between said subject and said controlled space.

8. A control method comprising the steps of:

evaluating one or more predetermined relationships;

sensing bio-signals from a selected subject;

converting said bio-signals into one or more frequency domain control parameters;

comparing one or more of said control parameters to a preselected control map; and generating one or more commands to control one or more aspects of an item.

9. The method of claim 8 wherein:

said one or more predetermined relationships comprise the relationship between said selected subject and said item; and said item comprises one or more of an appliance, an electronic device, and a parameter or an object in a virtual environment.

10. The method of claim 9 wherein said relationship comprises observation by said selected subject of said item.

11. The method of claim 9 wherein the step of evaluating further comprises:

providing an indicator observable by said selected subject; and detecting whether said selected subject is observing said indicator.

* * * * *